United States Patent
Singh et al.

(10) Patent No.: US 10,548,088 B2
(45) Date of Patent: Jan. 28, 2020

(54) DYNAMIC BASEBAND MANAGEMENT

(71) Applicant: Apple Inc., Cupertino, CA (US)

(72) Inventors: Ajoy K. Singh, Milpitas, CA (US); Jared S. Grubb, San Francisco, CA (US); Madhusudan Chaudhary, Campbell, CA (US); Saran Krishnaswamy, Santa Clara, CA (US); Jesus A. Gutierrez Gomez, Cupertino, CA (US); Sirisha Pillalamarri, San Francisco, CA (US); Samuel J. Miller, San Jose, CA (US); Rohan C. Malthankar, San Jose, CA (US); Sergey Sitnikov, San Jose, CA (US); Ziv Wolkowicki, Cupertino, CA (US); Dimitrios Prodanos, San Francisco, CA (US); Andreas E. Schobel, San Francisco, CA (US); Christopher P. Saari, San Francisco, CA (US); Keith W. Rauenbuehler, Sunnyvale, CA (US); Rafael L. Rivera-Barreto, Santa Clara, CA (US); Najeeb M. Abdulrahiman, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/964,456

(22) Filed: Apr. 27, 2018

(65) Prior Publication Data
US 2018/0352514 A1    Dec. 6, 2018

Related U.S. Application Data

(63) Continuation of application No. 15/609,668, filed on May 31, 2017, now Pat. No. 9,980,230.

(51) Int. Cl.
*H04W 4/02* (2018.01)
*H04W 88/06* (2009.01)
(Continued)

(52) U.S. Cl.
CPC ......... *H04W 52/0251* (2013.01); *H04W 4/02* (2013.01); *H04W 4/90* (2018.02);
(Continued)

(58) Field of Classification Search
None
See application file for complete search history.

(56) References Cited

U.S. PATENT DOCUMENTS 9,602,999 B2    3/2017  Kim et al.
2014/0106677 A1  4/2014  Altman
(Continued)

OTHER PUBLICATIONS

International Search Report and Written Opinion, Application No. PCT/US2018/033463, dated Oct. 19, 2018, 14 pages.

*Primary Examiner* — Ajit Patel
(74) *Attorney, Agent, or Firm* — Kowert Hood Munyon Rankin and Goetzel PC; Jeffrey C. Hood

(57) ABSTRACT

This disclosure relates to dynamic baseband management for a wireless device. The wireless device may be an accessory device. The accessory device may determine whether it has a short-range wireless communication link with a companion device. The accessory device may determine one or more proximity metrics relating to the companion device. The accessory device may further determine one or more metrics associated with user settings, user activity and/or application activity at the wireless device. The wireless device may select a (e.g., full, limited, or off) baseband operating mode based on any or all of these considerations.

20 Claims, 16 Drawing Sheets

(51) Int. Cl.
  *H04W 84/12* (2009.01)
  *H04W 52/02* (2009.01)
  *H04W 4/90* (2018.01)
  *H04W 4/80* (2018.01)
  *H04M 1/725* (2006.01)

(52) U.S. Cl.
  CPC ...... *H04W 52/0261* (2013.01); *H04M 1/7253* (2013.01); *H04W 4/80* (2018.02); *H04W 84/12* (2013.01); *H04W 88/06* (2013.01); *Y02D 70/00* (2018.01); *Y02D 70/10* (2018.01); *Y02D 70/1242* (2018.01); *Y02D 70/1262* (2018.01); *Y02D 70/1264* (2018.01); *Y02D 70/14* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/168* (2018.01); *Y02D 70/20* (2018.01); *Y02D 70/23* (2018.01); *Y02D 70/24* (2018.01); *Y02D 70/26* (2018.01)

(56) References Cited

U.S. PATENT DOCUMENTS

| | | |
|---|---|---|
| 2014/0106782 A1 | 4/2014 | Chitre |
| 2015/0057028 A1 | 2/2015 | Rudow |
| 2015/0334657 A1 | 11/2015 | Newham |
| 2015/0350598 A1* | 12/2015 | Yang ............... H04W 24/08 348/14.02 |
| 2016/0066273 A1 | 3/2016 | Prats |
| 2016/0070900 A1* | 3/2016 | Kim ............... G06F 21/34 726/3 |
| 2016/0143079 A1 | 5/2016 | Yoon |
| 2016/0192302 A1* | 6/2016 | Bar Bracha ............. H04L 1/205 370/350 |
| 2016/0212725 A1* | 7/2016 | Qiu ............... H04W 68/005 |
| 2016/0262094 A1 | 9/2016 | Khay-Ibbat et al. |
| 2016/0299779 A1 | 10/2016 | Kulkarni |
| 2017/0048385 A1* | 2/2017 | Kashimba ............. H04W 76/10 |
| 2017/0055195 A1 | 2/2017 | Ingale et al. |
| 2017/0064752 A1 | 3/2017 | Veikkolainen et al. |
| 2017/0118715 A1 | 4/2017 | Bhattacharya |
| 2017/0150363 A1* | 5/2017 | Tenny ............... H04L 63/18 |
| 2017/0164291 A1 | 6/2017 | Ludwig |
| 2017/0188182 A1 | 6/2017 | Jin |
| 2017/0269790 A1 | 9/2017 | Grandi |
| 2018/0084374 A1* | 3/2018 | Jain ............... H04W 4/14 |

\* cited by examiner

DYNAMIC BASEBAND MANAGEMENT

PRIORITY CLAIM

This application is a continuation of and claims priority to U.S. patent application Ser. No. 15/609,668, entitled "Dynamic Baseband Management," filed May 31, 2017, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to techniques for a wireless device to dynamically manage its baseband operations.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices. Therefore, improvements in the field are desired.

SUMMARY

Embodiments are presented herein of, inter alia, systems, apparatuses, and methods for a wireless device to dynamically manage its baseband operations.

The wireless device may be a link budget limited device, such as an accessory device with a relatively limited battery power capacity, e.g., due to device design constraints. Because of the relatively limited battery power capacity of the wireless device, avoiding excessive power use for baseband operations may be a priority.

Accordingly, the wireless device may gather information that may help with determining when and to what degree baseband operations would be worthwhile. Among the information gathered may be one or more proximity metrics relative to a companion device. Such proximity metrics may include the connection status and quality of one or more short-range wireless links between the wireless device and the companion device.

The wireless device may also determine one or more user activity and/or application activity metrics. These metrics may include one or more of various metrics of the user's activity or the activity, particularly communication activity, of any application(s) executing on the wireless device. Additionally or alternatively, any of various user settings on the wireless device may be considered. Such activity metrics may describe the communication requirements necessary to support activity on the wireless device, while the settings may relate to whether one or more types of wireless communication have been enabled/disabled by a user of the wireless device.

Based on the information gathered by the wireless device, the wireless device may determine a baseband operating mode. For example, the baseband operating mode may be determined based on any or all of the determined proximity metrics, user activity metrics, application activity metrics, and/or user settings. Generally, such baseband operating modes may comprise a range of power modes, from powered off to full-power, with various other possibilities. At least in some instances, the selected baseband operating mode may include a minimal amount of functionality that supports the communication requests of the wireless device, e.g., in view of possible other communication options available to the wireless device. This may help reduce the power consumption of the wireless device, e.g., by avoiding unnecessary baseband operations that would be redundant and/or not permitted.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
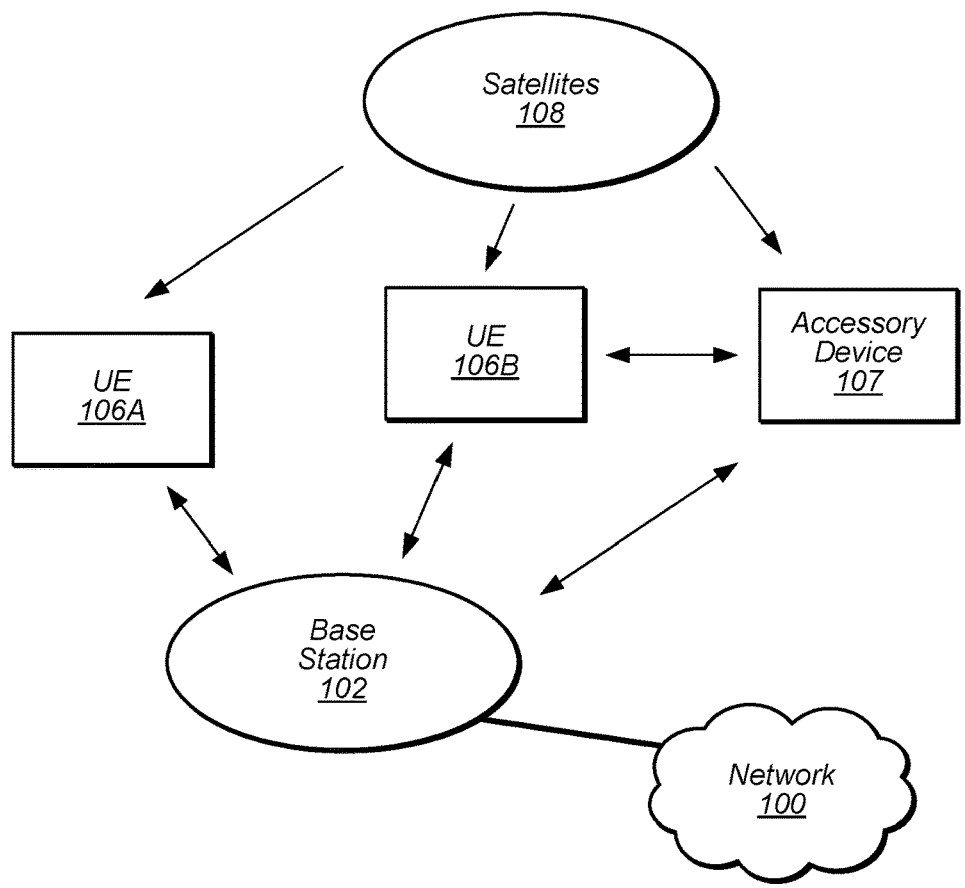
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke interpretation under 35 U.S.C. § 112(f) for that component.

FIG. 1—Wireless Communication System

FIG. 1 illustrates an example of a wireless communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

As further shown, the exemplary wireless communication system includes multiple satellites 108, which may provide wireless (e.g., RF) signals to one or more wireless devices 106A, 106B, etc., as well as accessory device 107. The wireless signals from the satellites 108 may allow any or all of the UEs 106/107 that are so configured to determine their location information, e.g., in accordance with one or more global navigational satellite system (GNSS, e.g., GPS, GLONASS, Galileo, Beidou) technologies. For example, one of the UEs 106/107 might triangulate the longitude, latitude, and/or altitude/elevation of the device based on time indications from the set of satellites 108 within communication range of the device.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, NR, WLAN, Bluetooth, one or more GNSS technologies, one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as an accessory device 107, while the UE 106B associated with the accessory device 107 may be referred to as a companion device to the accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. The accessory device 107 further includes GNSS communication capability and hence is able to directly determine accurate location information for the accessory device 107 based on signals received from the satellites 108. However, since the accessory device 107 is possibly one or more of communication, output power and/or battery limited, the accessory device 107 may in some instances selectively utilize the UE 106B as a proxy for communication purposes with the base station 102 and hence to the network 100, and/or for location determination purposes with satellites 108. In other words, the accessory device 107 may selectively use the cellular and/or GNSS communication capabilities of its companion device (e.g., UE 106B) to conduct its cellular and/or GNSS communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

Figure 2:
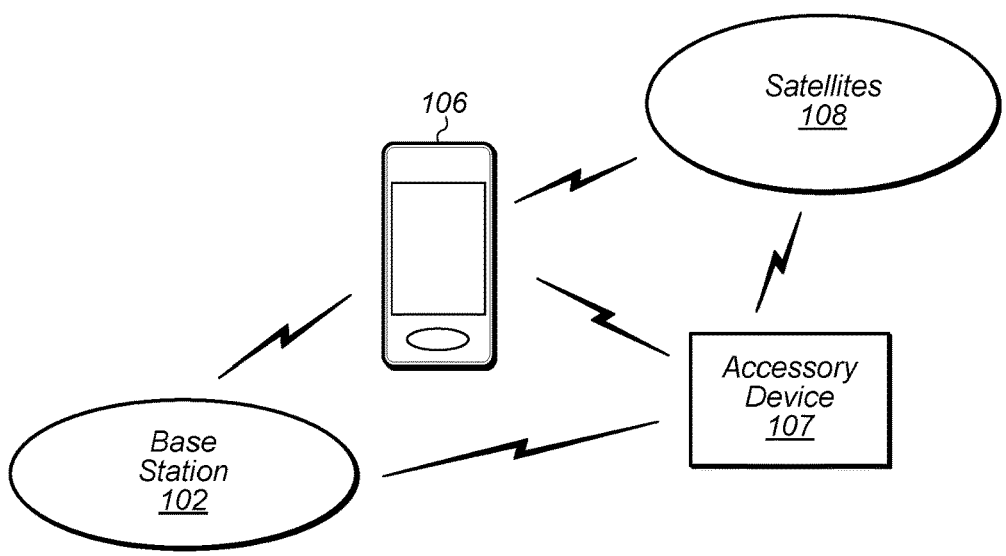
FIG. 2 illustrates an example system where an accessory device can selectively either directly communicate with a cellular base station or utilize the cellular capabilities of an intermediate or proxy device such as a smart phone, according to some embodiments.

FIG. 2 illustrates an example accessory device 107 in communication with base station 102 and satellites 108, according to some embodiments. The accessory device 107 may be a wearable device such as a smart watch. The accessory device 107 may comprise cellular communication capability and be capable of directly communicating with the base station 102 as shown. The accessory device 107 may also have GNSS communication capability and be capable of directly communicating with the satellites 108 as shown. When the accessory device 107 is configured to directly communicate with the base station and/or satellites 108, the accessory device may be said to be in "autonomous mode."

The accessory device 107 may also be capable of communicating with another device (e.g., UE 106), referred to as a proxy device, intermediate device, or companion device, using a short range communications protocol; for example, the accessory device 107 may according to some embodiments be "paired" with the UE 106. Under some circumstances, the accessory device 107 may use the cellular and/or GNSS functionality of this proxy device for communicating cellular voice/data with the base station 102 and/or for determining location information for the paired devices from the satellites 108. For example, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As a further example, the timing signals provided by the satellites 108 may be received by the UE 106 and used to determine the location of the UE 106, which may then relay the location information to the accessory device 107. Note that such location information may serve as approximate location information for the accessory device 107, e.g., as the accessory device 107 may be sufficiently close to the UE 106 to perform short range wireless communication, but may not be as accurate as location information obtained when the accessory device 107 utilizes its own GNSS functionality. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. According to some embodiments, the cellular modem may also include GNSS functionality integrated into the cellular modem, though the GNSS functionality may be provided separately if desired. The cellular modem may include one or more processors (processor elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106 or 107 might be configured to communicate using a single shared radio. The shared radio may couple to a single antenna, or may couple to multiple antennas (e.g., for MIMO) for performing wireless communications. Alternatively, the UE device 106 or 107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. As previously noted, when the UE 106 is capable of being used by the accessory device 107 as a proxy, the UE 106 may be referred to as a companion device to the accessory device 107.

Figure 3:
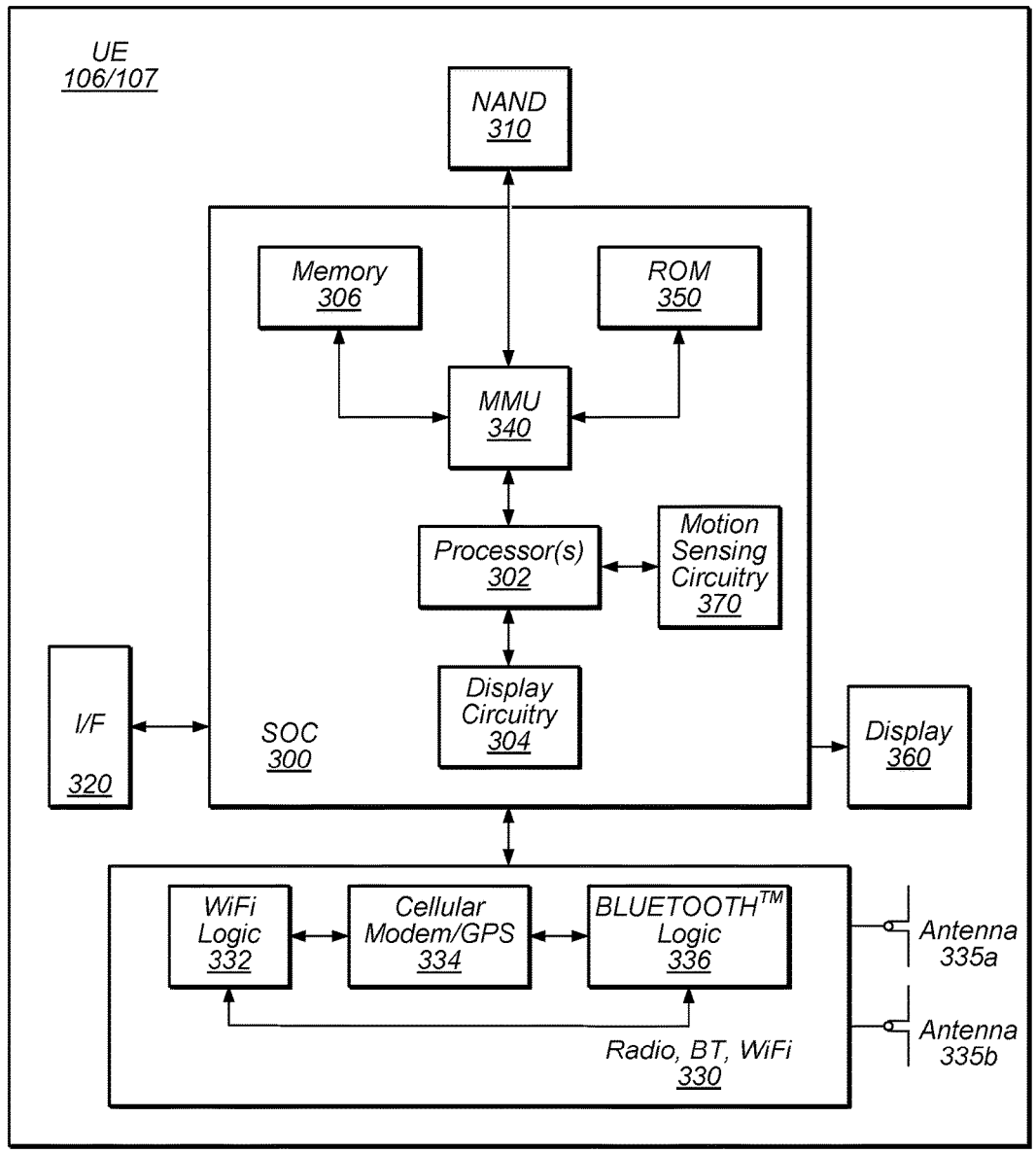
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies. According to some embodiments, cellular modem 334 may have GPS and/or other GNSS functionality co-located on the same integrated circuit (e.g., chip), as shown, though it should be noted that this functionality may be provided separately if desired.

As described herein, UE 106/107 may include hardware and software components for implementing embodiments of this disclosure. For example, one or more components of the wireless communication circuitry 330 (e.g., Wi-Fi logic 332, cellular modem/GPS 334, BT logic 336) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
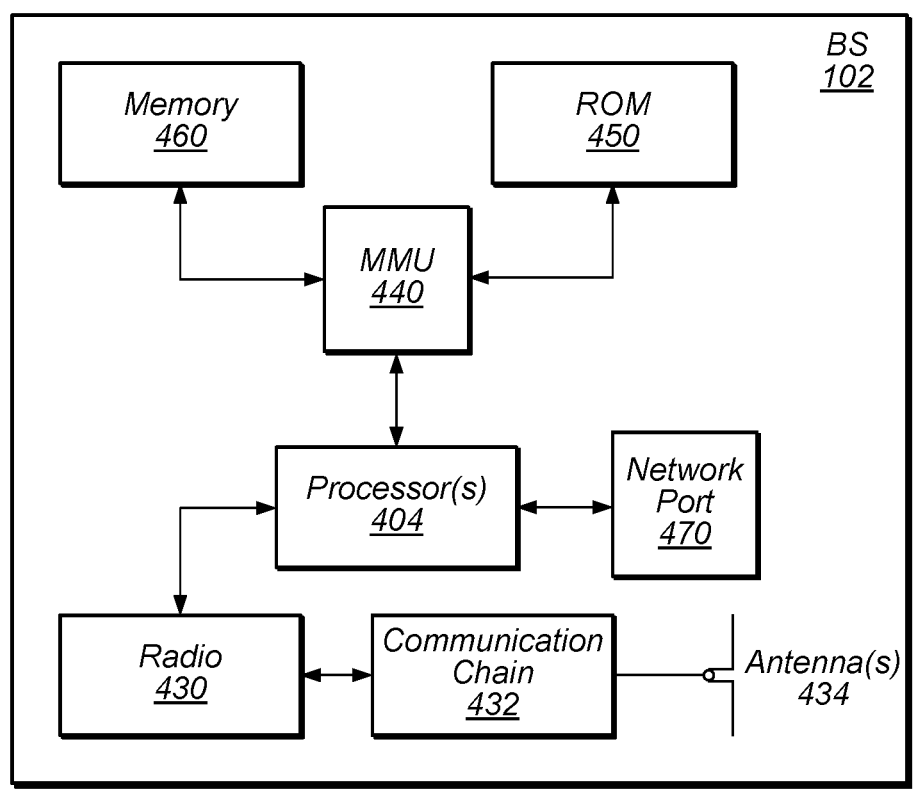
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
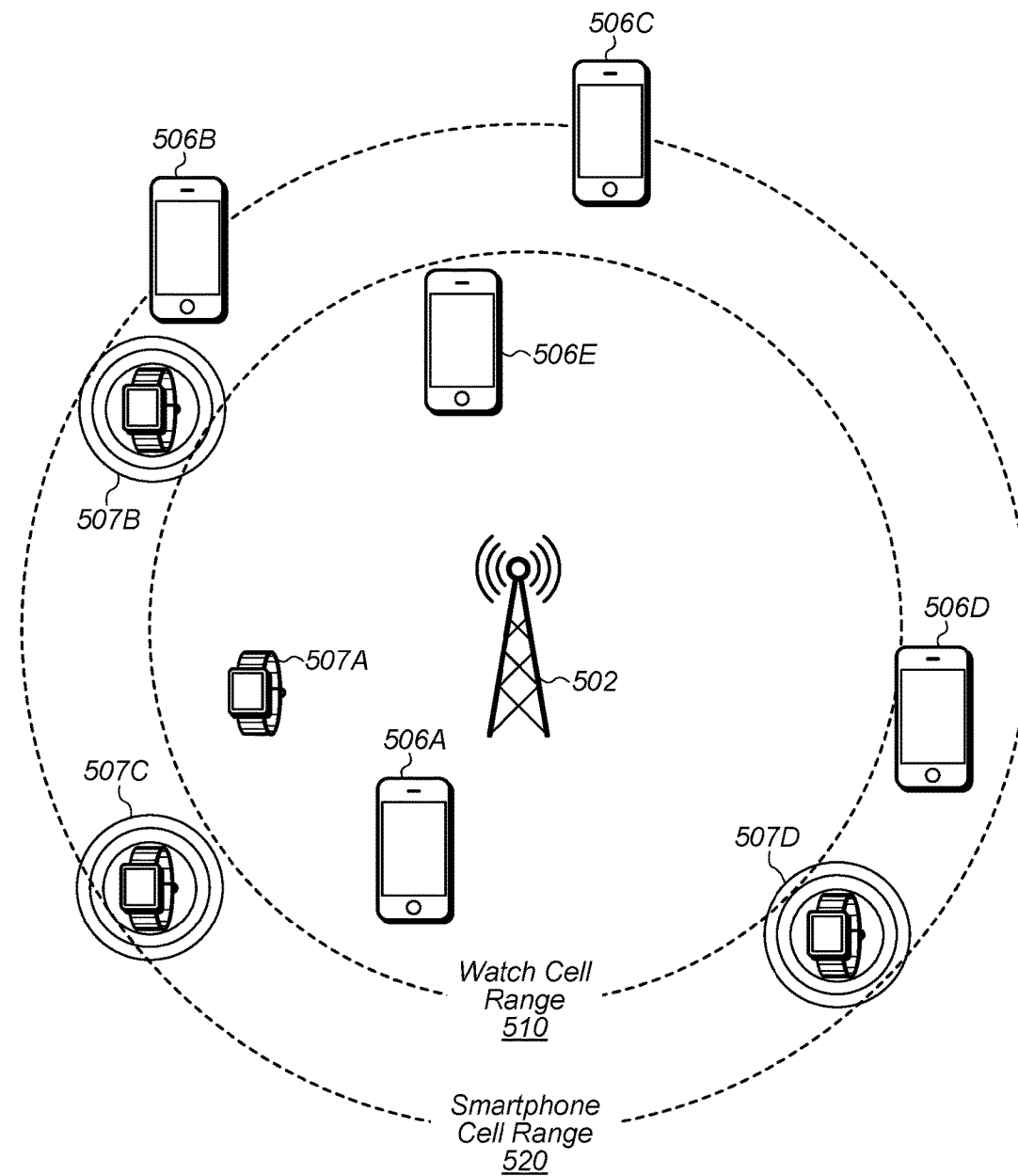
FIG. 5 illustrates a possible example coverage scenario for smartphones and smart watches, according to some embodiments.

FIG. 5—Example Coverage Range

As noted above, a wireless device may be a link budget limited device, such as an accessory device with a relatively limited communication range, e.g., due to device design constraints. Because of the relatively limited communication range of the wireless device, cellular communication service coverage for the wireless device may not be as widespread as for many other wireless devices, which may in turn result in the wireless device experiencing less cellular communication capabilities than a wireless device with greater communication range.

FIG. 5 illustrates one possible example of a coverage scenario for smartphones (an exemplary companion device) and smart watches (an exemplary accessory device), according to some embodiments. As shown, a base station 502 may provide a cell for a variety of wireless devices, including various smartphones 506 and various smart watches 507. As previously discussed, such different types of devices may have differing characteristics that result in different effective communication ranges. Thus, as shown, the effective watch cell range 510 may be smaller than the effective smartphone cell range 520. As a result, while all of the illustrated smartphones (506A, 506B, 506C, 506D, 506E) may be have good communication quality with the base station 502, only one of the illustrated smart watches (507A) may enjoy similar communication quality, and the remainder of the illustrated smart watches (507B, 507C, 507D) may have lower communication quality (e.g., and may be outside of communicative range of the base station 502).

In view of the potentially more limited communication range/capability of an accessory device (e.g., a smart watch 507) in comparison to its companion device (e.g., a smartphone 506), it may commonly be preferred to utilize a relay link with a companion device for communications when such a link is available. Considering the potentially more limited battery capacity of an accessory device, it may further be helpful to dynamically manage the baseband operation of an accessory device, e.g., to limit battery consumption during times when full baseband operation is not necessary (and potentially not optimal), such as when a relay link with a companion device can support any desired communication needs of the accessory device at a lower power cost than by the accessory device autonomously using its own baseband communication capabilities.

It should be noted that while the above is described as being directed to accessory devices or link budget limited devices, such techniques may also be beneficial to non-link budget limited wireless devices (e.g., including wireless devices with larger cellular communication ranges, such as the smartphones illustrated in FIG. 5), and may also or alternatively be used in conjunction with such devices if desired.

FIG. 6—Flowchart

In wireless devices, particularly accessory or wearable devices, maximizing battery life, given the small form factor and, thus limited battery capacity, is an important consideration. Providing more dynamic management of baseband operations is one possible technique to potentially improve battery life of these devices.

Figure 6:
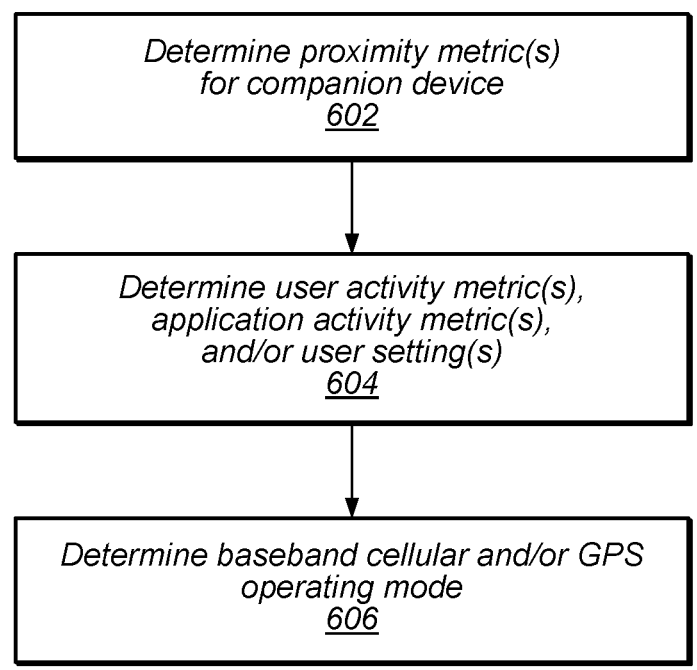
FIG. 6 is a flowchart diagram illustrating an exemplary method for a wireless device to dynamically manage its baseband operations, according to some embodiments.

FIG. 6 is a flowchart diagram illustrating one such method for a wireless device (e.g., an accessory device) to dynamically manage its baseband operations, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 6 may be implemented by a wireless device, such as a UE 106 or 107 illustrated in and described with respect to FIGS. 1-3, or more generally in conjunction with any of the computer systems or devices shown in the above Figures, among other devices, as desired. As shown, the method may operate as follows.

In 602, a wireless device (e.g., UE 107), may determine one or more proximity metrics for a companion device (e.g., UE 106). The proximity metrics determined may include any of various possible metrics relating to the proximity (or lack of proximity) of a companion device to the wireless device. As one possibility, the wireless device may determine whether the wireless device has a relay wireless link to a companion device. A relay wireless link may be made using a short-range wireless communication technology, such as Bluetooth or Wi-Fi (potentially as a Wi-Fi peer-to-peer link or in an infrastructure mode, e.g., via an intermediary access point). The wireless device may also determine whether the wireless device has a wireless link to one or more Wi-Fi access points or cellular base stations (for example BS 102), in some embodiments.

For any wireless links available, the wireless device may also determine the type of each such wireless link (e.g., whether it provides relay link with a companion device, whether it provides wide area network (WAN) (e.g., Internet) connectivity, whether it is a Wi-Fi link, a Bluetooth link, a cellular link (potentially including a type of cellular technology), etc.). Such information may be useful as different link types may have different characteristics, and may thus affect the preferred baseband operating characteristics.

Another possible set of proximity metrics may include the length of time for which each such wireless link has been connected and/or the length of time for which each such link has not been connected. These metrics may be useful to the wireless device by allowing it to avoid spending energy initiating baseband operations in instances where a short-range wireless link is likely to be available in a short time. Baseband operations may require time (e.g., 10 to 15 seconds, in some instances; other values are also possible) to initiate, and thus it may be inefficient to initiate baseband operations because of a momentary loss of a short-range wireless link which may have preferred operating characteristics (e.g., lower power use).

At least in some instances, the wireless device may also or alternatively determine signal strength, signal quality, and/or any of various other possible metrics relating to link quality for some or all available links. For example, for a Wi-Fi relay link via an access point, any or all of RSSI, SNR, first hop packet loss, second hop packet loss, among various possible metrics, may be considered. Such metrics may be useful to determine which link or links may be best able to meet the performance needs of any application(s) running on the device while avoiding excessive power usage.

At least in some instances, the wireless device may determine whether it has a subscriber identity module (SIM) that provides a cellular service plan, and may potentially consider details of the cellular service plan (e.g., a carrier providing the cellular service plan, one or more locations (e.g., mobile country codes) associated with the cellular service plan, etc.).

In 604, the wireless device (e.g., UE 107) may determine one or more user activity metrics, application activity metrics, and/or user settings. These metrics may include one or more of various metrics of the user's activity or the activity, particularly communication activity, of any application(s) executing on the wireless device.

As one possible example, the wireless device may determine activity metrics related to the call activity or call settings on the device, such as whether the user is initiating an emergency call or a non-emergency voice call. These metrics may inform the priority given to communication activity and thus what wireless link(s) may be most appropriate.

As a further example, the metrics may include whether any application executing on the wireless device is actively performing wireless communication. In the instance where no application is actively performing wireless communication, the wireless device may determine to reduce the power usage of wireless communication circuitry.

As a further possibility, the wireless device may determine whether any application is requesting the location information for the wireless device. In the case that such location information is requested, a wireless link able to provide accurate location information may be required.

In some instances, the metrics may include predictions of future activity based at least in part on past or current activity. For example, the wireless device may recognize a communication activity pattern in an application and use this pattern to predict future wireless link requirements.

As a still further example, the metrics may include a physical position of the wireless device relative to the user of the wireless device. For example, a wearable wireless device such as a watch may consider a higher performance operating mode to be preferable if the device is being worn (e.g., is on a user's wrist), e.g., relative to an alternative case wherein it is not near the user.

As a still further example, the metrics may include the screen state and/or device locked/unlocked state of the wireless device. For example, a screen off state and/or device locked state may be considered representative of a lower user activity level, while a screen on state and/or device unlocked state may be considered representative of a higher user activity level, which may in turn affect the perceived importance of providing a full-power baseband operating mode versus a more limited or powered off baseband operating mode.

As a still further example, the metrics may include information about the activity of a companion device. For example, the wireless device may infer that a certain application executing on a companion device may be a predictor of future activity (or lack thereof) on the wireless device. As another example, a metric may comprise whether or not the companion device is connected to an external power source for battery charging and/or the amount of charge in the battery of the companion device.

As a still further example, the metrics may include information about the status of the battery of the wireless device. For example, a metric may comprise the amount of charge in the battery. Additionally or alternatively, the wireless device may determine whether it is currently connected to an outside power source (e.g., a charger). This may affect the relative priority given to reducing power consumption; for example, reducing power consumption may be a lower priority when connected to an external power source than when relying on battery power reserves.

As a still further example, the metrics may include information about the location of the wireless device. For example, a metric may comprise whether the wireless device is near a location where the wireless device is frequently connected to an external power source for battery charging, whether the wireless device is in a location with home or equivalent home network cellular service, roaming cellular service, or no cellular service according to a cellular service plan of the wireless device, and/or any of various other location related considerations.

The wireless device may also or alternatively determine various user settings, e.g., settings associated with cellular communication permission, in determining a baseband operating mode or settings relating to a preferred operating mode of the wireless communication circuitry. For example, the user settings may include whether full use of a cellular modem of the wireless device is permitted, partial use (e.g., in airplane mode) is permitted, or use of the cellular modem of the wireless device is not permitted. As another example, the user settings may include whether Wi-Fi calling is permitted. Any number of other such user settings are also possible.

According to some embodiments, the wireless device may consider some or all of the various metrics and settings described herein (among various other possible metrics/settings) to determine a minimum functionality level that would support any user-initiated activities on the wireless device (e.g., and that is permitted). Such minimum functionality level may be used as a minimum performance threshold for selecting one or more of the various available wireless links.

In 606, the wireless device (e.g., UE 107) may determine a baseband and/or GPS operating mode. Note that according to some embodiments, baseband cellular and GPS operations may be co-located in the wireless device, and thus may be treated as such. In alternate embodiments, cellular and GPS (and/or other GNSS) functionality may be separately provided in the wireless device and thus may be handled more distinctly. Several exemplary baseband and/or GPS operating modes (which may be referred to collectively as baseband operating modes for simplicity, e.g., based on an example scenario with co-located baseband cellular and GPS functionality, while recognizing that a baseband cellular operating mode and a GPS operating mode of a wireless device may be determined and/or managed independently if desired) are described in the non-limiting list below. As one of skill in the art will understand, not all possible and relevant baseband modes are described here, and other possible baseband operating modes are included within the scope of the present disclosure.

One possible baseband mode may include a baseband operating mode including cellular voice communication capability. Such an operating mode may allow the device to autonomously handle voice calls without relying on other wireless links, e.g., using one or more cellular communication technologies, such as LTE, LTE-A, NR, UMTS, GSM, CDMA2000, etc. At least according to some embodiments, such a baseband operating mode may be capable of supporting either or both of circuit switched or packet switched (e.g., VoLTE) voice communications. Note that any of various possible power conservation features for cellular operation may be used in conjunction with the baseband operating mode including cellular voice communication capability, including idle discontinuous reception (IDRX), connected discontinuous reception (CDRX), and/or any of various other possible power conservation features, e.g., during times when cellular communication is not actively being performed.

A further example baseband operating mode may include cellular voice and data communication capability. In addition to supporting voice calls using one or more cellular communication technologies (and potentially using any of various possible power conservation features for cellular operation), such an operating mode may allow the device to perform more general data exchanges (e.g., video calls, video streaming, bulk downloads, background or foreground application refresh activities, and/or other data exchanges) without relying on other wireless links.

Further possible baseband operating modes may include one or more modes in which the wireless device does not perform cellular transmissions. As one possibility (e.g., a camp-only or commercial mobile alert system (CMAS) mode), such an operating mode may allow the wireless device to receive information (e.g., emergency messages such as CMAS messages) via cellular communication. As another possibility (e.g., an airplane mode), such an operating mode may not allow the wireless device to receive information via cellular communication. At least according to some embodiments, the wireless device may be able to determine location information for the wireless device while in either such operating mode, e.g., as GPS communication capabilities may remain available using the baseband circuitry of the wireless device even though at least cellular transmission capabilities may be unavailable in such operating modes.

Another possible baseband operating mode is a powered-off baseband operating mode. For example, if no application is requesting location information and all communication requirements can be met via other links, a baseband-off mode may be selected.

The determination of a baseband operating mode may be based on any or all of the proximity metrics, user activity metrics, application activity metrics, and/or user settings discussed above, among other possible considerations. In at least some examples, the baseband operating mode may be selected in order to avoid excessive power use while still providing an acceptable user performance.

As a first example of baseband operating mode determination, the wireless device may consider activity metrics that indicate a minimum functionality level necessary to support any user-initiated activities on the wireless device in combination with proximity metrics and as permitted by user settings and/or a cellular service plan of the wireless device. Such a minimum functionality level may be used as a minimum performance threshold for selecting one or more of the various available wireless links. Using proximity metrics, the wireless device may determine whether any available short-range link may be able to meet this minimum performance threshold. In the event that the wireless device determines that no available short-range link meets the minimum performance threshold, a baseband operating mode that does meet the minimum performance threshold (assuming such a mode is permitted and supported by a cellular service plan) may be selected. Alternatively, in the case that one or more available wireless links do meet the minimum performance threshold (and/or in the case that at least some cellular operations are not permitted or not supported by a cellular service plan), a power-off or low-power baseband operating mode may be selected. In other words, based on considering activity metrics in relation to proximity metrics, if one or more user-initiated activities at the wireless device require functionality that is not supported by any available relay wireless link, the wireless device may initiate a baseband operating mode that may be able to provide the required functionality.

As a further example, building on the previous minimum performance threshold example, an operating mode capable of voice and data communication may be selected based on a combination of activity metrics (indicating a minimum performance threshold) and proximity metrics. For example, in the case that activity metrics indicate that both voice and data communication are required (e.g., for a video call) and that proximity metrics indicate that no appropriate short-range communication link is available, a baseband mode including cellular voice and data communication capability may be required.

As a further example of baseband operating mode determination, the wireless device may determine a baseband operating mode based at least in part on whether the wireless device has a relay wireless link with the companion wireless device and further based at least in part on the type of the relay wireless link. For example, if the wireless device has a Bluetooth relay link, the wireless device may select a power-off baseband operating mode, e.g., in order to conserve energy, as the Bluetooth relay link may be able to provide any wireless communication services requested by the wireless device. A possible exception (as further described subsequently herein) may include if accurate location information is requested (e.g., for a fitness application), e.g., since location information obtained by the companion device may relate to the location of the companion device rather than the wireless device itself.

As a further example, a baseband operating mode that includes voice calling capability may be selected based at least in part on user activity metrics and/or application activity metrics, for example, based on call status and relevant user settings. As one possibility, when initiating a call via a relay link, the wireless device may also promptly initiate a full baseband operating mode regardless of what short-range links may be available, e.g., in order to increase the reliability of the call. In this case, baseband initiation may allow for a more rapid automatic (or manual) attempt to connect the call over a cellular communication link if needed, e.g., should failure of a call via the relay link occur. As another possibility, the wireless device may attempt the call over a relay link (e.g., via Bluetooth) if available and may initiate full baseband operating mode if (e.g., after) the call fails on the relay link. Note that if desired, different approaches may be taken for different types of calls. For example, full baseband mode may be brought up in parallel with attempting a call via a relay link for an emergency call, while full baseband mode may be brought up only after an unsuccessful call attempt via a relay link for a non-emergency call, according to some embodiments. Further, the wireless device may consider call preference settings (e.g., Wi-Fi voice calling permission settings) in determining a baseband operating mode when the user initiates a voice call.

As a further example of baseband operating mode determination, the wireless device may determine a baseband operating mode based at least in part on activity metrics related to location services in combination with proximity metrics. For instance, an application requiring location information of the wireless device may be considered a location exception. If no other metric (e.g., no other activity metric or proximity metric), or combination of metrics, requires power-on baseband operation, but an active application requests accurate location information, power-off baseband operation may be inadequate, e.g., since location information received via relay link may be accurate for the companion device but only approximate for the wireless device itself. Accordingly, at least in some instances, the wireless device may select a limited baseband operating mode (e.g., an airplane mode or a camp-only mode). Such a limited baseband operating mode may allow the wireless device to reduce power consumption by not performing cellular transmissions, while still allowing the wireless device to determine accurate location information for the wireless device via baseband (e.g., GPS) communications. However, this exception may not be required for all applications. Some applications (e.g., fitness applications, in some instances) may require high-precision location information for the wireless device itself (and thus require the location exception), however for other applications (e.g., mapping applications, in some instances) the location of the companion device may be sufficient (and thus the exception may not be required and a power-off baseband operating mode may be adequate). Note that these examples of applications that may require accurate location information or for which approximate location information may be sufficient are provided for illustrative purposes only, and that the relative accuracy of the location information requested by an application may differ at various times, for different applications of similar types, and/or for different application types, among various possibilities.

Note that, at least in some instances, the wireless device may determine not to initiate a full baseband operating mode notwithstanding other indications (e.g., other metrics), e.g., based at least in part on cellular communication permission settings. For example, in some instances, the wireless device might determine to operate a full baseband operating mode with cellular voice and data communication capability if no relay link with a companion device or Wi-Fi link is available and if one or more applications have communication requests, provided user permission for cellular communication is enabled. However, if user permission for cellular communication is disabled, the wireless device might instead in such a case determine to operate in a powered-off baseband operating mode (or possibly a limited power baseband operating mode, e.g., if required by regulations for possible reception of emergency messages) despite the lack of a relay link with a companion device or Wi-Fi link and the communication request(s).

FIGS. 7-22—Dynamic Baseband Management

FIGS. 7-22 and the following information are provided as being illustrative of further considerations and possible implementation details relating to the method of FIG. 6, and are not intended to be limiting to the disclosure as a whole. Numerous variations and alternatives to the details provided herein below are possible and should be considered within the scope of the disclosure.

Wearable and other accessory devices are typically smaller in form factor and hence may be resource constrained. For example, an accessory device may have limited battery, processing, and/or memory resources. In many instances, an accessory device may have a companion device with greater resources. For user convenience (among other possible reasons), it may be desirable for an accessory device to have a similar battery life as its companion device, potentially despite such devices having differing resources available.

In many instances, an accessory device may support multiple radio interfaces (e.g., Bluetooth, Wi-Fi, and baseband (potentially in turn supporting global navigational satellite system (GNSS) capabilities such as global positioning system (GPS) and/or wireless wide area network connectivity such as NR, LTE-A, LTE, UMTS, GSM, etc.). At different times and/or in different circumstances, different radio interfaces among those available may be best suited to provide network connectivity.

Given the potential resource constraints of an accessory device, it may accordingly be beneficial (e.g., to potentially improve battery life to be comparable to a companion device despite having potentially lesser battery capacity) to utilize the radio interfaces of an accessory device selectively, rather than simultaneously powering all of the device's radio interfaces throughout the day. In some instances (e.g., for some form factors), such dynamic selection of radio technologies may be essential to ensure that the battery capacity of a device can last for a reasonable amount of time, such that without dynamic selection of radio technologies, it may not be possible to support a viable product with a full range of radio technology capability for certain form factors.

In order to support dynamic radio link selection and baseband management, it may be useful to provide a central entity that can utilize cross layer metrics to help decide which radio technologies to use at which times, e.g., to provide good power efficiency while also providing good user experience.

Figure 7:
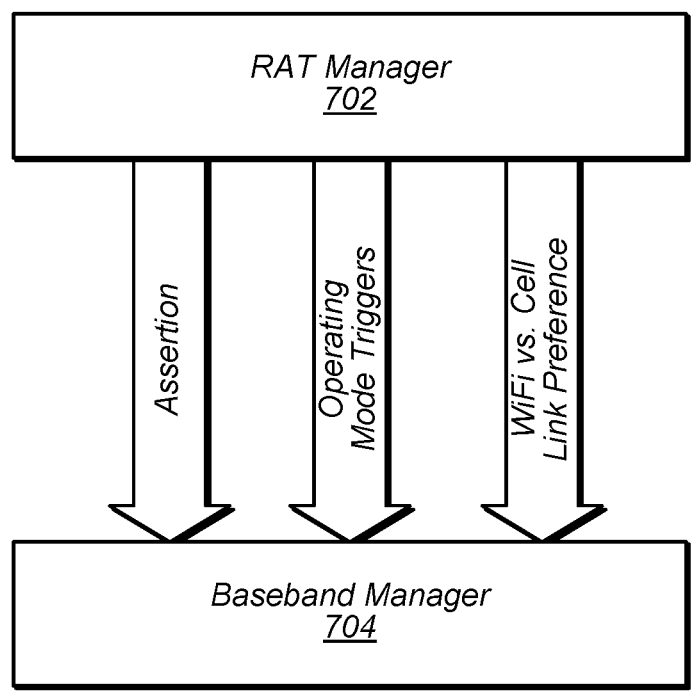
FIG. 7 is a diagram illustrating an example logical structure for managing wireless operations of a wireless device, according to some embodiments.

FIG. 7 is a logical diagram illustrating one such possible central entity (e.g., RAT manager 702) that can use cross layer metrics to decide when to use Bluetooth, Wi-Fi, and cellular connectivity for telephony services, according to some embodiments. The RAT manager 702 may decide when to use a relay wireless link (e.g., with a companion device) versus direct cellular connectivity for voice and data on an accessory device, potentially including enabling telephony services when relay service is not possible over a BT or Wi-Fi relay link. As shown, the RAT manager 702 may provide triggers to a baseband manager 704 to bring up the baseband manager 704 when needed, to indicate preferred baseband operating mode(s) (e.g., when to use baseband for GPS usage versus when to use a relay connection for GPS connectivity), and/or to indicate a link preference (e.g., Wi-Fi versus cellular) for telephony services.

Figure 8:
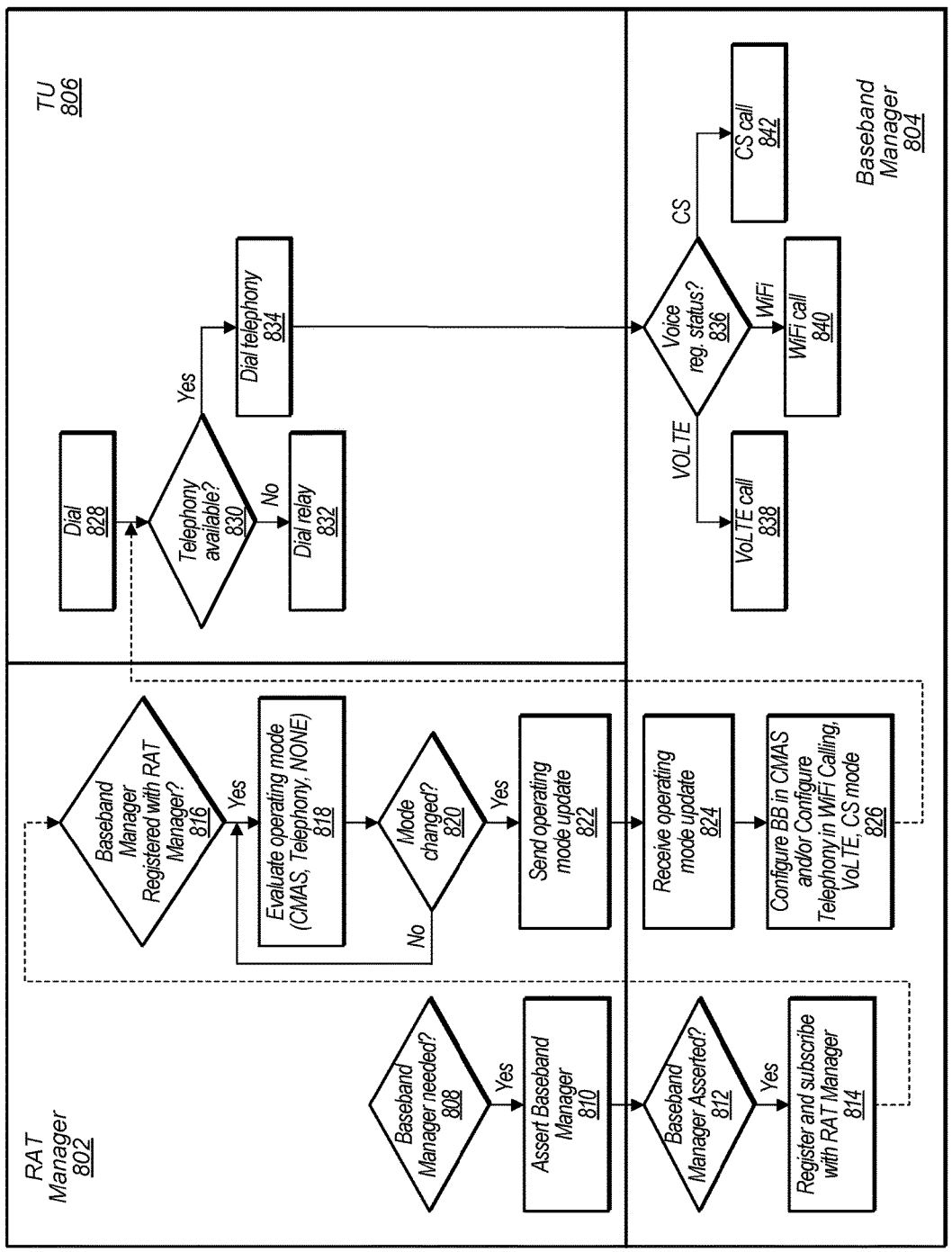
FIG. 8 is a flowchart diagram illustrating exemplary possible steps for managing wireless operations of a wireless device using the logical structure of FIG. 7, according to some embodiments.

FIG. 8 is a flowchart diagram illustrating possible decisionmaking and communication relating to dynamically managing baseband operations of an accessory device, according to some embodiments. As shown, entities involved in the decisions and the interactions may include a RAT manager entity 802, a baseband manager entity 804, and a telephony utilities (TU) application 806.

In 808, the RAT manager 802 may determine whether the baseband manager 804 is needed. As previously noted, the RAT manager 802 may consider any of a variety of metrics to determine which radio interface(s) to use at a given time. The metrics may include proximity metrics (e.g., whether a BT and/or Wi-Fi relay link with a companion device are available), whether the device is in a screen locked or screen unlocked (or other lock/unlock) state, one or more timers relating to how recently a BT and/or Wi-Fi relay link with a companion device were available, a subscriber identity module (SIM) state of the accessory device, and/or any of various other considerations. As least in some instances (e.g., if a reliable BT relay link is available and there are no exceptional circumstances), there may be no need to power up the baseband circuitry of the accessory device, and thus potentially no need for the baseband manager 804.

In other instances, however, it may be determined that at least some baseband functionality may be useful. Accordingly, in 810 (e.g., in such an instance) the RAT manager 802 may assert the baseband manager 804.

In 812, the baseband manager 804 may monitor whether it has been asserted.

In 814, upon being asserted, the baseband manager 804 may register and subscribe with the RAT manager 802.

In 816, the RAT manager 802 may confirm that the baseband manager 804 is registered with the RAT manager 802.

Once the baseband manager 804 is registered with the RAT manager 802, in 818, the RAT manager 802 may evaluate which of various possible baseband operating modes to use. The possible baseband operating modes may include a commercial mobile alert system (CMAS) mode (e.g., in which limited functionality may be available), a telephony mode (e.g., in which cellular voice calls may be possible), or none (e.g., if baseband operations are no longer needed), among various other possible modes.

In 820, it may be determined if the desired baseband operating mode has changed, e.g., as a result of the evaluation in step 818. The RAT manager 802 may remain in an evaluation loop, returning to step 818, if the desired baseband operating mode has not changed.

In 822, if the desired baseband operating mode has changed, the RAT manager 802 may provide an operating mode update to the baseband manager 804, e.g., indicating the desired baseband operating mode.

In 824, the baseband manager 804 may receive the operating mode update from the RAT manager 802.

In 826, based on the operating mode update, the baseband manager may configure the baseband circuitry/software/firmware in accordance with the desired baseband operating mode. For example, baseband may be configured in the CMAS mode, and/or to perform telephony using VoLTE or a circuit-switched (CS) mode or possibly a Wi-Fi calling mode. Thus, this may include increasing the amount of baseband functionality, limiting the amount of functionality, or powering the baseband off, e.g., depending on the previous baseband operating mode and the updated baseband operating mode.

The telephony utilities application 806 may provide a phone application, e.g., providing an interface for users to dial (e.g., voice) calls via the accessory device. Thus, in 828, the TU application 806 may receive user input dialing a call. As shown, the TU application 806 may receive an indication from the baseband manager of whether telephony services are available at the accessory device itself. Accordingly, in 830, the TU application 806 may determine whether telephony is available. If telephony is not available (e.g., if the RAT manager has not brought up the baseband manager due to having a good quality relay link), in 832, the TU application 806 may dial the call using the relay link. In such a case, a companion device of the accessory device may complete the call, and may use the relay link to relay voice packets for the call to and from the accessory device once the call is established. If telephony is available, in 834, the TU application 806 may dial the call using telephony services provided by the accessory device itself, e.g., by way of the baseband manager 804 as shown.

In 836, upon receiving an indication from the TU application 806 to dial a call, the baseband manager 804 may determine its voice registration status. As previously noted, the baseband manager 804 may be registered for VoLTE calling, Wi-Fi calling, or CS calling, among various possibilities, e.g., depending on available links, user settings/permissions, SIM/cellular plan availability, and/or other considerations.

Thus, in 838, if the baseband manager 804 is registered for VoLTE calling, the baseband manager 804 may attempt to establish a VoLTE call. In 840, if the baseband manager 804 is registered for Wi-Fi calling, the baseband manager 804 may attempt to establish a Wi-Fi call. In 842, if the baseband manager 804 is registered for CS calling, the baseband manager 804 may attempt to establish a CS call.

Figure 9:
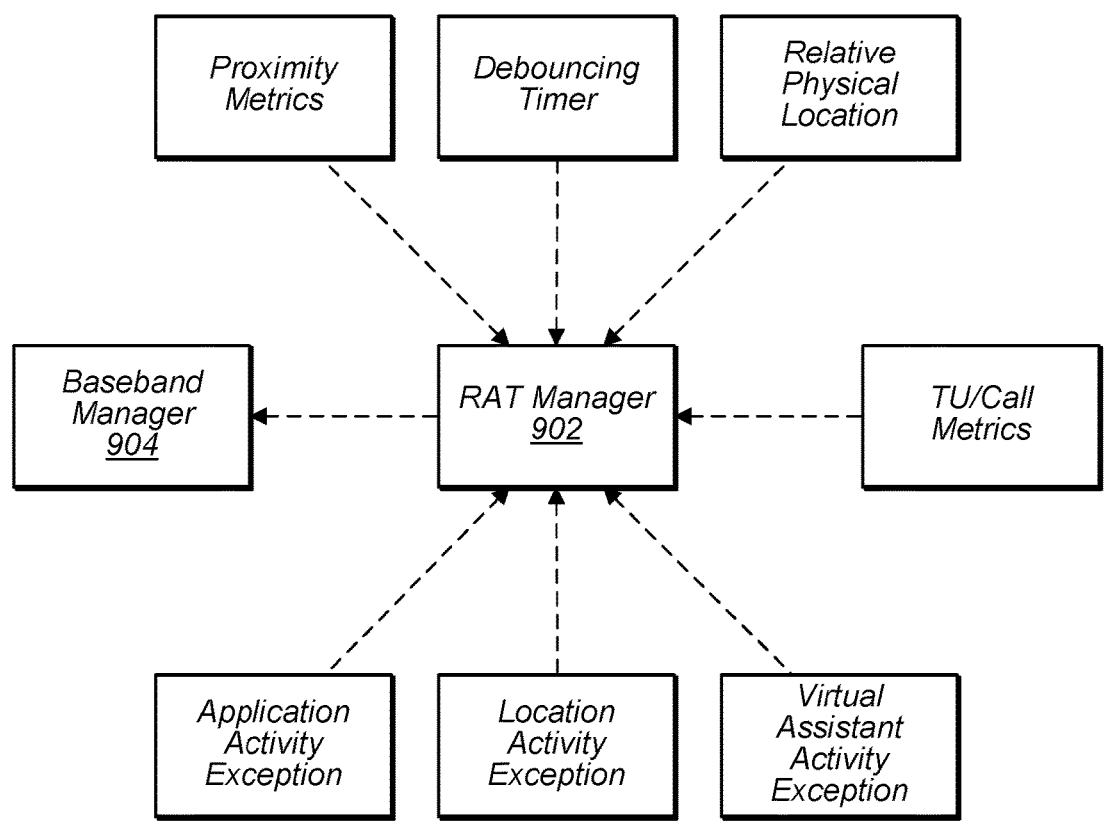
FIG. 9 illustrates a variety of possible information that may be considered when managing wireless operations of a wireless device, according to some embodiments.

As previously noted, any of a variety of (e.g., potentially cross-layer) metrics may be considered when determining which radio interface(s) to use at an accessory device at a given time. FIG. 9 is a diagram illustrating a variety of such possible metrics that may be provided to a RAT manager 902, according to some embodiments.

As shown, one possible set of metrics that may be provided to the RAT manager 902 may include proximity metrics, e.g., relating to a companion device to the accessory device. Such metrics may include the proximity state of the companion device (e.g., whether or not a companion device to the accessory device is in proximity at all), and which type(s) of proximity links (e.g., Bluetooth, Wi-Fi, etc., and potentially including multiple types) are available.

Another metric or set of metrics may include one or more debouncing timers. A debouncing timer may record an amount of time since the accessory device has had a relay link. In some instances, there may be a debouncing timer for each of multiple possible types of relay links (e.g., one for a BT relay link, one for a Wi-Fi relay link, as one possibility).

A further metric or set of metrics may relate to a physical location of the accessory device relative to a user of the accessory device, e.g., if the accessory device is a wearable device that is more likely to experience active use by a user when worn in an intended location. For example, whether a watch is currently being worn on a user's wrist, an armband is currently being worn on a user's arm, etc., may be considered in determining how much baseband functionality to provide.

A still further possible set of metrics may include metrics relating to a telephony utilities application and/or existing or recent calls. For example, the RAT manager may consider whether a call is currently established, any telephony related user settings (e.g., whether the device is in airplane mode, whether cellular permission is on/off, etc.), whether the device has a valid SIM/cellular service plan, and/or any other such telephony related considerations when managing the radio interface usage of the accessory device.

A yet further set of metrics may include whether any application and/or user activity related exceptions are detected. For example, if an application (e.g., a fitness application, a mapping application, etc.) is requesting accurate location information for the accessory device, or a user-initiated activity such as use of a virtual personal assistant or other application is occurring, such activities may bias the RAT manager towards providing increased radio interface functionality to support those activities.

As shown, based on the various metrics considered by the RAT manager 902, the RAT manager 902 may provide input to the baseband manager 904 with respect to how to manage baseband operations.

Figure 10:
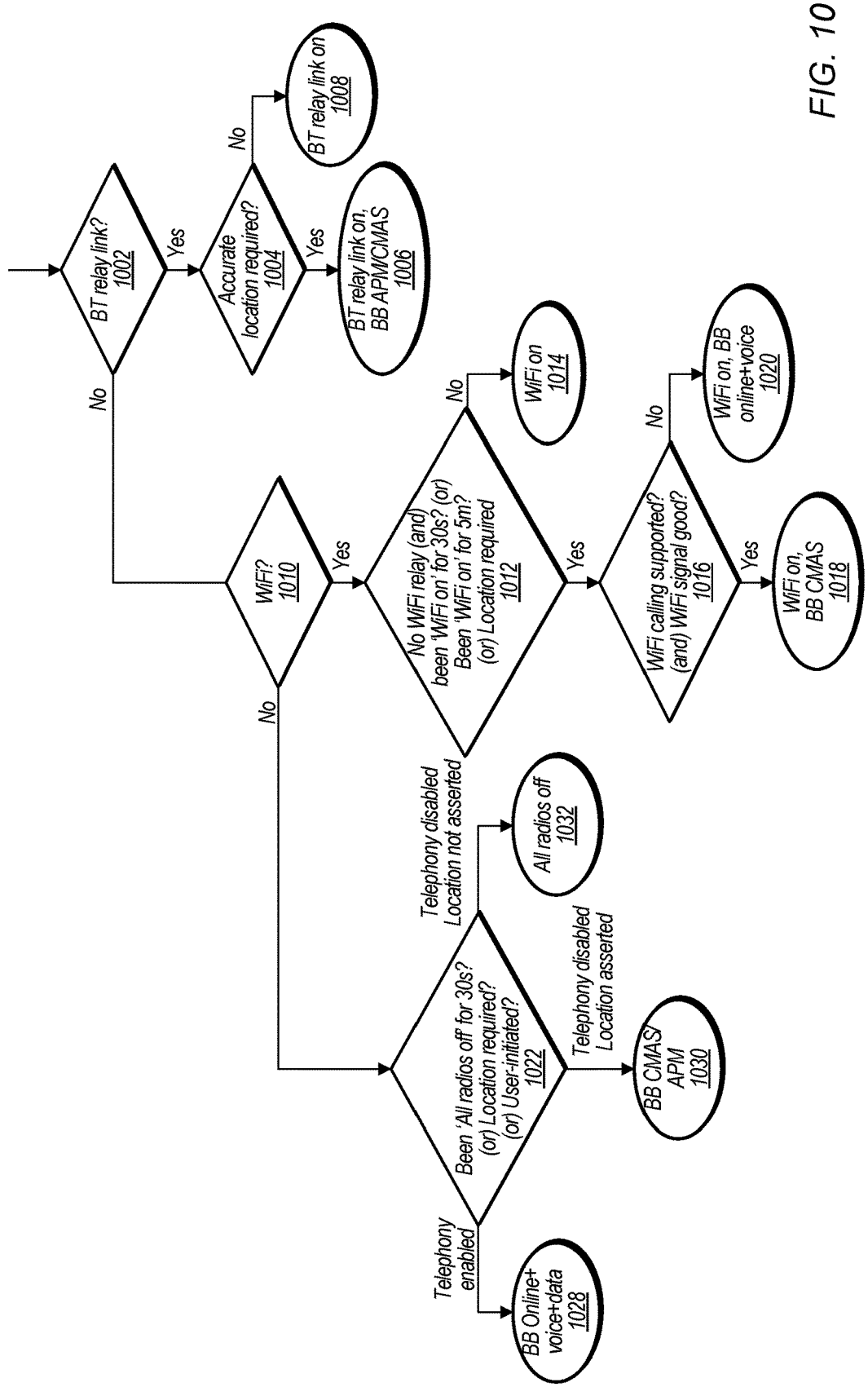
FIGS. 10-18 are flowchart diagrams illustrating exemplary possible processes for implementing wireless operating mode changes, according to some embodiments.

Any of a variety of algorithms or processes may be used by the RAT manager 902 to determine how the baseband manager should manage the baseband operations based on the considerations illustrated in FIG. 9 (and/or various other possible considerations). FIG. 10 is a flowchart diagram illustrating one such possible scheme for an accessory device to determine a baseband operating mode based on such considerations, according to some embodiments.

In 1002, it may be determined whether the accessory device has a BT relay link.

If the accessory device has a BT relay link, in 1004 it may be determined whether accurate location information is required by the accessory device (e.g., if an application executing on the accessory device is requesting location information for the accessory device). If accurate location information is required, in 1006 it may be determined to operate the accessory device with the BT relay link on, and with baseband operating in a limited functionality mode (e.g., an airplane mode in which the wireless device can use GPS but cannot transmit or receive cellular signals, or a CMAS mode in which the wireless device can use GPS but cannot transmit cellular signals). If accurate location information is not required, in 1008 it may be determined to operate the accessory device with the BT relay link on, and with the baseband powered off.

If the accessory device does not have a BT relay link, in 1010 it may be determined whether the accessory device has a Wi-Fi link. If the accessory device has a Wi-Fi link, in 1012 it may be determined if any of several conditions associated with at least partial baseband use in addition to Wi-Fi are met. One such condition may include if there is no Wi-Fi relay link (e.g., the Wi-Fi link does not provide a relay link to the companion device) and the accessory device has been on the Wi-Fi link (e.g., and/or has not had a BT relay link) for at least a predetermined amount of time (e.g., 30 s, as shown, or any other desired value). Another such conditions may include if the accessory device has been on the Wi-Fi link (e.g., and/or has not had a BT relay link) for at least a predetermined amount of time (e.g., 5 minutes, as shown, or any other desired value), potentially even if the Wi-Fi link provides a relay link with the companion device. A further such condition may include if accurate location information is required by the accessory device. If no such conditions are met, in 1014 it may be determined to operate the accessory device with the Wi-Fi link on, and with the baseband powered off.

If any such conditions are met, however, in 1016 it may be determined whether Wi-Fi calling is supported and Wi-Fi conditions are considered good enough to support Wi-Fi calling. If Wi-Fi calling is supported and Wi-Fi conditions are considered good enough to support Wi-Fi calling, in 1018 it may be determined to operate the accessory device with the Wi-Fi link on, and with the baseband operating in a limited functionality mode (e.g., the CMAS mode). If Wi-Fi calling is not supported or if Wi-Fi conditions are not considered good enough to support Wi-Fi calling, in 1020 it may be determined to operate the accessory device with the Wi-Fi link on, and with the baseband fully functional and supporting voice communications. Note that in this case, data communications may still primarily or exclusively be performed via the Wi-Fi link, if desired.

If the accessory device does not have a Wi-Fi link, in 1022 it may be determined if any of several conditions possibly associated with at least partial baseband use without Wi-Fi are met. One such condition may include if the accessory device has had all radios off (e.g., has not had a BT relay link, a Wi-Fi link, or baseband powered on) for at least a predetermined amount of time (e.g., 30 s, as shown, or any other desired value). Another possible condition may include if accurate location information is required by the accessory device. A still further possible condition may include if one or more user-initiated activities that request wireless communication are occurring.

If any such conditions are met, the determined operating mode may still further depend on which conditions are met and/or one or more user settings at the accessory device. In 1028, if telephony is enabled, and one or more of the conditions are met, it may be determined to operate the accessory device with the baseband fully functional and supporting voice and data communications. In 1030, if telephony is disabled, and at least a location request is asserted, it may be determined to operate the accessory device with the baseband operating in a limited functionality mode (e.g., airplane mode and/or CMAS mode). In 1032, if telephony is disabled, and no location request is asserted, and/or if none of the conditions are met, it may be determined to operate the accessory device with all radios off.

FIGS. 11-18 are flowchart diagrams illustrating possible processes a RAT manager to use to determine whether to assert a baseband manager, and to evaluate which baseband operating mode to use, in accordance with various example scenarios.

Figure 11:
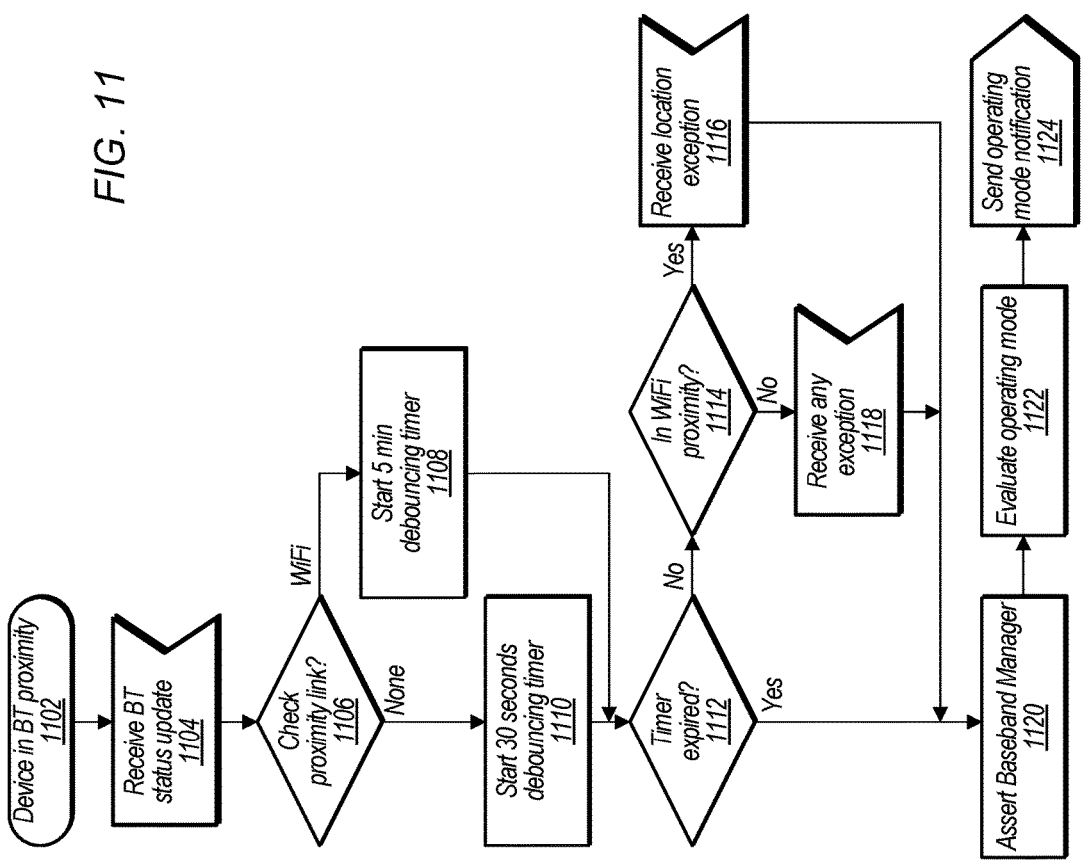

In FIG. 11, in 1102, an accessory device may initially be in BT proximity to a companion device. In 1104, a status update may be received indicating that the BT relay link has been lost. In 1106, it may be determined whether a Wi-Fi proximity link is available. In 1108, if a Wi-Fi proximity link is available, a 5 minute debouncing timer may be started. In 1110, if no proximity link is available, a 30 second debouncing timer may be started.

In 1112, the RAT manager may monitor whether the debouncing timer has expired. In 1114, if the timer has not yet expired, the RAT manager may monitor whether the accessory device has gained a Wi-Fi proximity link with the companion device. In 1116, if a Wi-Fi proximity link has been gained and a location exception is received, or in 1118, if a Wi-Fi proximity link has not been gained but any exception is received, or once the debouncing timer has expired, the RAT manager may proceed to step 1120, in which the baseband manager may be asserted. In 1122, the RAT manager may evaluate which baseband operating mode is desired, and in 1124, the RAT manager may send a notification of which baseband operating mode is desired to the baseband manager.

Figure 12:
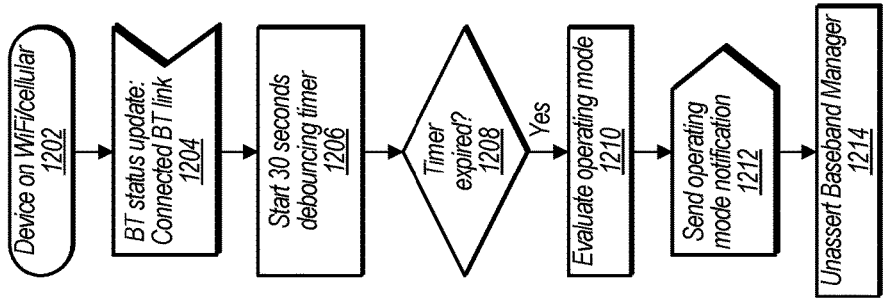

In FIG. 12, in 1202, an accessory device may initially have Wi-Fi and cellular baseband operations active. In 1204, a status update may be received indicating that a BT relay link has been connected. In 1206, a 30 second debouncing timer may be initiated. In 1208, it may be determined whether the debouncing timer has expired. Once it has expired, in 1210, the RAT manager may evaluate which baseband operating mode is desired. In 1212, the RAT manager may send a notification of which baseband operating mode is desired to the baseband manager. In case the desired operating mode is baseband powered off, in 1214 the RAT manager may unassert the baseband manager.

Figure 13:
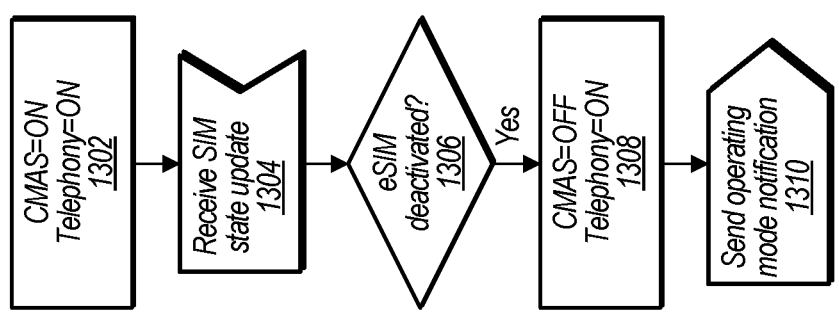

In FIG. 13, in 1302, an accessory device may initially have baseband operating in CMAS=ON, telephony=ON mode. In 1304, a SIM state update may be received. In 1306, it may be determined if the SIM state update included deactivating an eSIM of the accessory device. If so, in 1308, the RAT manager may determine to operate with CMAS=OFF, telephony=ON mode, and in 1310, the RAT manager may send an operating mode notification to the baseband manager indicating the change to the operating mode.

Figure 14:
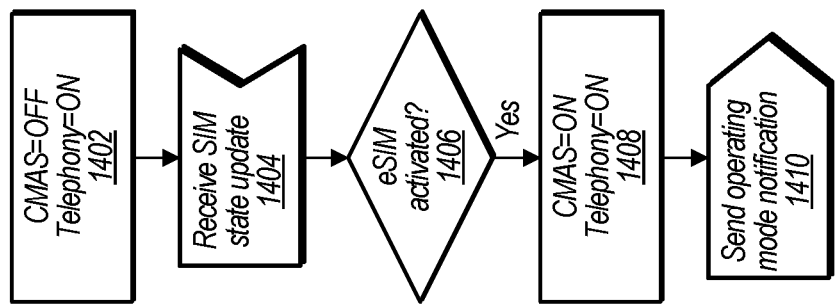

In FIG. 14, in 1402, an accessory device may initially have baseband operating in CMAS=OFF, telephony=ON mode. In 1404, a SIM state update may be received. In 1406, it may be determined if the SIM state update included activating an eSIM of the accessory device. If so, in 1408, the RAT manager may determine to operate with CMAS=ON, telephony=ON mode, and in 1410, the RAT manager may send an operating mode notification to the baseband manager indicating the change to the operating mode.

Figure 15:
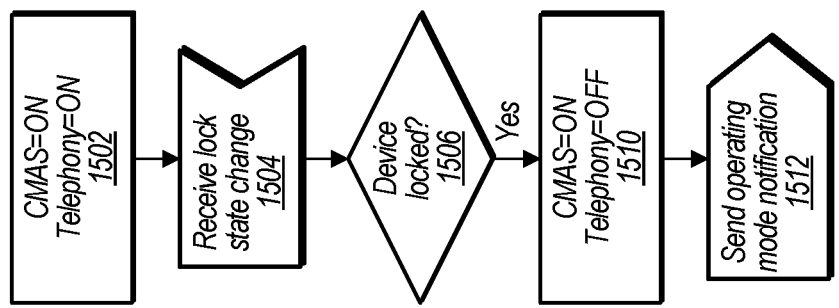

In FIG. 15, in 1502, an accessory device may initially have baseband operating in CMAS=ON, telephony=ON mode. In 1504, a lock state change indication may be received. In 1506, it may be determined if the lock state change indication included indicating that the device is locked. If so, in 1508, the RAT manager may determine to operate with CMAS=ON, telephony=OFF mode, and in 1510, the RAT manager may send an operating mode notification to the baseband manager indicating the change to the operating mode.

Figure 16:
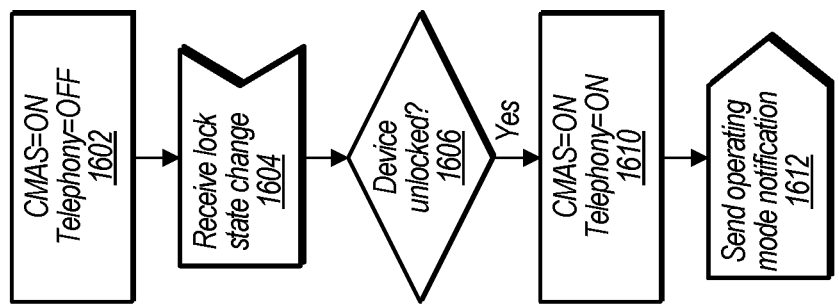

In FIG. 16, in 1602, an accessory device may initially have baseband operating in CMAS=ON, telephony=OFF mode. In 1604, a lock state change indication may be received. In 1606, it may be determined if the lock state change indication included indicating that the device is unlocked. If so, in 1608, the RAT manager may determine to operate with CMAS=ON, telephony=ON mode, and in 1610, the RAT manager may send an operating mode notification to the baseband manager indicating the change to the operating mode.

Figure 17:
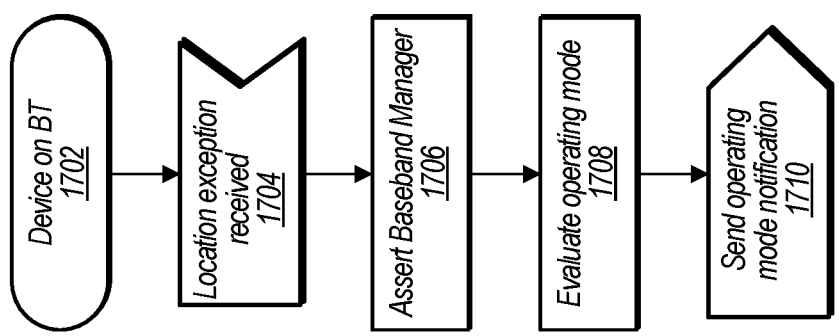

In FIG. 17, in 1702, an accessory device may initially have a BT proximity link with baseband powered off. In 1704, a location exception may be received. In 1706, the RAT manager may assert the baseband manager. In 1708, the RAT manager may evaluate which baseband operating mode to select. In 1710, the RAT manager may send an operating mode notification to the baseband manager indicating the selected baseband operating mode.

Figure 18:
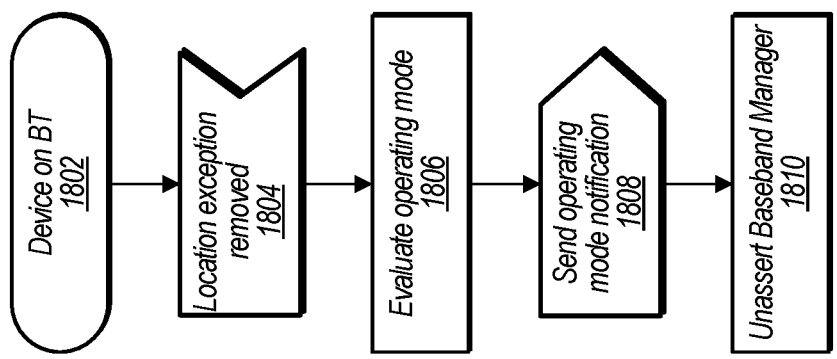

In FIG. 18, in 1802, an accessory device may initially have a BT proximity link with baseband powered on, e.g., due to a location exception. In 1804, the location exception may be removed. In 1806, the RAT manager may evaluate which baseband operating mode to select. In 1808, the RAT manager may send an operating mode notification to the baseband manager indicating the selected baseband operating mode. In 1810, the RAT manager may unassert the baseband manager.

Figure 19:
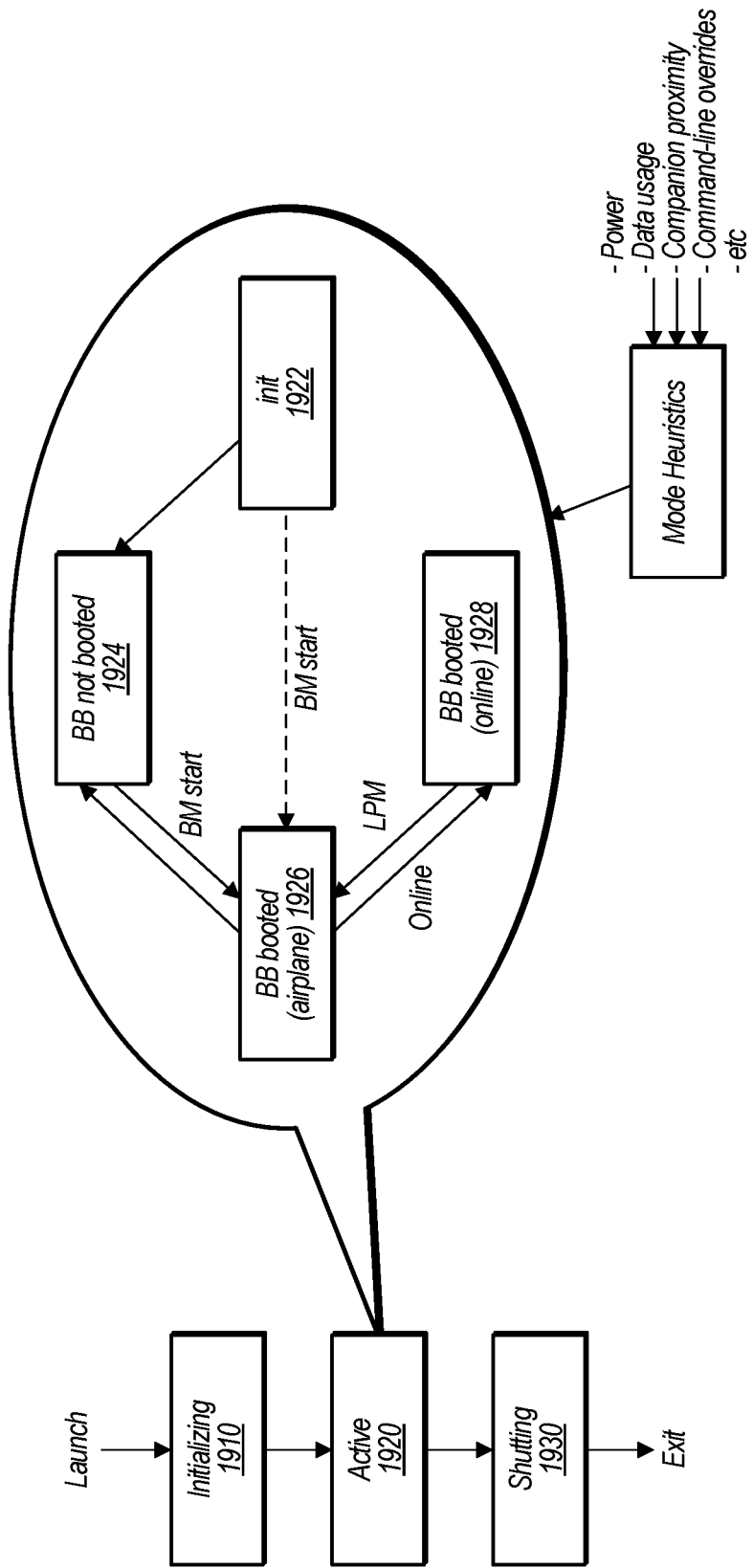
FIG. 19 illustrates various possible states of an exemplary possible baseband management entity, according to some embodiments.

FIG. 19 includes a state diagram illustrating various possible baseband operating states that may be implemented by a baseband manager (e.g., upon being asserted by a RAT manager and receiving instructions from the RAT manager), according to some embodiments. Upon being asserted, in 1910, the baseband manager may initialize, and once initialized, in 1920, may be active. Once active, the baseband manager may transition between an initial state 1922, a baseband not booted state 1924, a baseband booted (airplane mode) state 1926, and a baseband booted (online) state 1928. As shown, in some embodiments, the BB not booted state 1924 may be skipped and the baseband manager may transition from the initial state 1922 directly to the baseband booted (airplane mode) state 1926. Additionally, note that in some embodiments, the baseband manager may directly consider any of various possible mode heuristics to determine state transitions to perform, e.g., in addition or as an alternative to receiving instructions regarding the baseband operating state from the RAT manager. Such heuristics may be based on power (e.g., batter reserves), current/upcoming data usage, companion proximity, command-line overrides, and/or any of various other possible inputs. In 1930, (e.g., if so instructed/if unasserted by the RAT manager), the baseband manager may begin shut down and exit.

According to some embodiments, an accessory device may include a communication center ("CommCenter") daemon that launches and manages various modules used to support cellular voice and data communications. A baseband manager such as previously described herein may be one such module. A phone service module may be another such module. An IP multimedia subsystem (IMS) stack (e.g., for VoLTE and Wi-Fi calling) may be another such module. A data module for managing packet data network (PDN) connections (e.g., for cellular and Wi-Fi radios) may be a still further such module.

The baseband manager may be responsible for many of the baseband platform services, such as boot-up, interprocessor communication, trace, coexistence considerations, etc. The baseband manager may support a framework that provides interfaces to clients (e.g., applications executing at an application processor of the accessory device) to perform baseband related communications. At least in some instances, the baseband manager may be configured such that it is not required when cellular service is not required, such that it may be brought down (e.g., to save power at the baseband chip, and/or to save memory at the application processor RAM). Thus, it may be the case that the baseband manager supports starting and stopping its services on-demand. The CommCenter may use the baseband manager's application program interfaces (APIs) to start/stop its operation.

Figure 20:
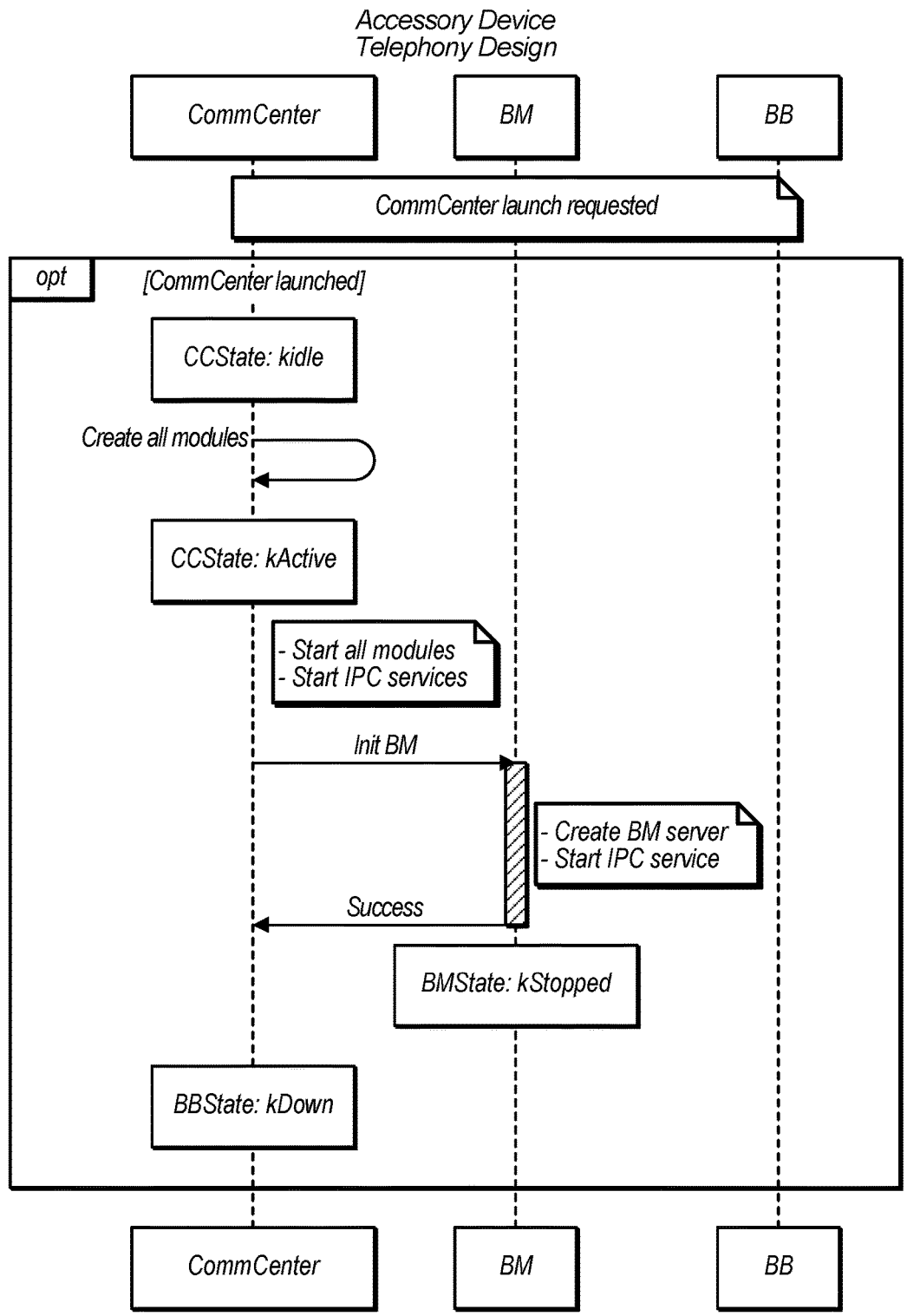
FIGS. 20-22 are communication flow diagrams illustrating exemplary possible communication flows that may be used as part of managing baseband operations, according to some embodiments.
Figure 21:
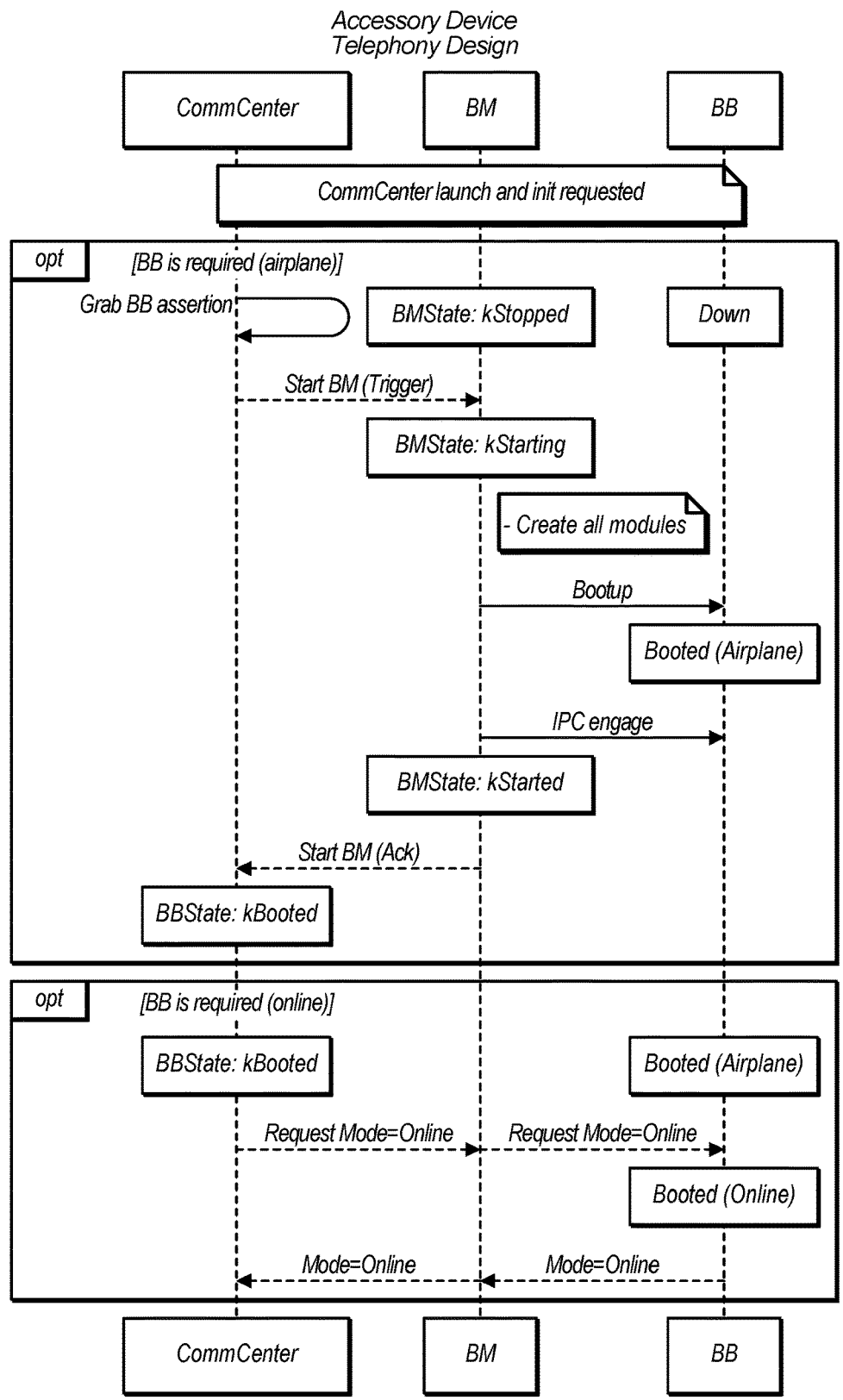
Figure 22:
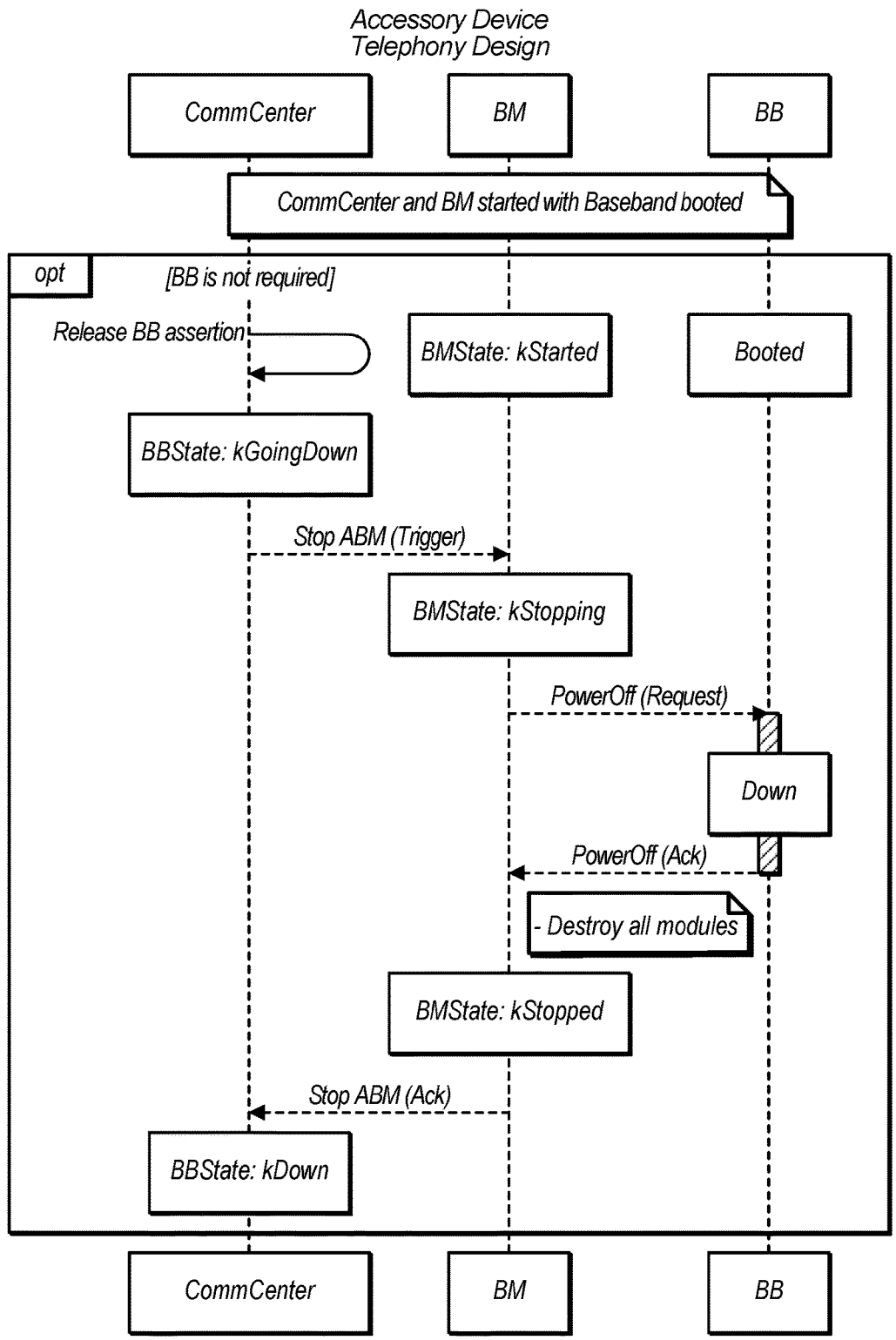

FIGS. 20-22 are communication flow diagrams illustrating possible intermodule communication in a wireless device that utilizes a communication center daemon and baseband manager module under the management of the communication center daemon to manage baseband operations.

FIG. 20 illustrates a communication flow that might occur when the communication center is not yet launched but its launch is requested. As shown, the communication center may be launched and may transition from an idle state to an active state by creating all modules under its management. In starting all modules, the communication center may initiate the baseband manager, which may create its baseband manager server and start interprocessor communication (IPC) service. The baseband manager may report its successful initiation to the communication center. Without further instruction, the baseband manager may remain in a stopped state, and the baseband state may remain down.

FIG. 21 illustrates a communication flow that might occur when the communication center is launched and baseband operation is requested. As shown, the communication center may provide a grab baseband assertion, and may provide a trigger to the baseband manager (which may be in a stopped state) to begin starting. In response, the baseband manager may create all modules under its management, and may bootup the baseband (which may have been down), and, once booted (e.g., in airplane mode, at least initially), engage interprocessor communication. At this point, the baseband manager may be started, and may provide an acknowledgement to the communication center, which may recognize that the baseband state is now booted.

If full baseband operation is requested, the communication center may further provide a request for online mode to the baseband manager, which may in turn provide a request for online mode to the baseband. The baseband may transition from the booted (airplane) state to the booted (online state), and may acknowledge that it has transitioned to the booted (online) state to the baseband manager, which may in turn acknowledge that baseband has transitioned to the booted (online) state to the communication center.

FIG. 22 illustrates a communication flow that might occur when the communication center is launched and baseband is booted, but baseband is no longer required. As shown, the communication center may provide a release baseband assertion, and may provide a trigger to the baseband manager (which may be in a started state) to begin stopping. In response, the baseband manager may provide a power off request to the baseband, which may power down from the booted state to being down. The baseband manager may destroy all modules under its management At this point, the baseband manager may be stopped, and may provide an acknowledgement to the communication center, which may recognize that the baseband state is now down.

Another consideration for an accessory device that may at least on some occasions be near a companion device may include how to handle emergency calling. Since both devices may be capable of dialing an emergency call, possibly each using any of multiple possible techniques (e.g., circuit switched cellular, packet switched cellular, Wi-Fi, etc.), determining which technique(s) to use in which scenarios may be non-trivial. Further, due to the potentially substantially higher priority (and potentially different handling/permission by carriers) of emergency calls relative to other calls, at least in some instances, emergency calling may trigger different radio interface usage than other device usage.

According to some embodiments, if an accessory device has a BT relay link with a companion device, an initial attempt to establish an emergency call may be made using the companion device by way of the BT relay link. This may often be preferable as the companion device may often have a better antenna, higher power, and/or other characteristics improving the likelihood of successfully establishing the call. However, in case the companion's call fails (or the BT relay link fails), it may be desirable to bring up the accessory device's own baseband circuitry (e.g., in case it was off) at the same time as (e.g., in parallel with) the companion's attempt to establish the emergency call. This may allow the accessory device to more quickly (e.g., as an automatic redial, or in case of a further attempt to dial the emergency call by the user) attempt to establish the emergency call using its own baseband capability if needed. Note that while this process may differ from handing of non-emergency calls (e.g., baseband voice capability may remain off during a non-emergency call if a BT relay link to a companion device exists) in some instances, in other instances baseband may be brought up in parallel for non-emergency calls as well. Additionally, it should be noted that bringing up an additional radio interface as a fallback option for a call may be useful for potential handover of the call, e.g., in case one radio interface fails while the call is ongoing, which may allow the accessory device to avoid at least some call drops.

As an alternative to bringing up the accessory device's baseband voice capability in parallel with attempting an emergency call via a BT relay link with a companion device (and/or potentially as a technique for non-emergency calls), the accessory device's baseband may be brought up as a fallback option upon (e.g., after) failure of a call using a BT relay link with a companion device. Thus, the call may be automatically redialed, or may be redialed in response to user input, using the baseband functionality. This may reduce the power consumption of the accessory device, e.g., as the accessory device may be able to avoid unnecessarily consuming power to bring up its baseband in instances when calls using a BT relay link with a companion device are successful, but may increase the time required to complete calls in instances when using a BT relay link with a companion device is unsuccessful, and/or may lead to call failure if the BT relay link fails during a call.

A further modification to radio interface management associated with emergency calling may relate to when an accessory device does not have a valid (e)SIM/does not have a cellular service plan. At least in some instances, the accessory device may at least partially limit baseband operation or power off its baseband circuitry if the accessory device does not have a valid SIM/cellular service plan, e.g., under normal circumstances. However, if user input initiating an emergency call is received, the accessory device may bring online at least voice baseband functionality and attempt to establish the emergency call even though the accessory device does not have a SIM or cellular service plan.

Reference is made herein to possible limited functionality baseband operating modes, potentially including an airplane mode (e.g., in which a wireless device may not transmit or receive cellular communications) and/or a camp-only or CMAS mode (e.g., in which a wireless device may not transmit cellular communications, though the wireless device may still be able to receive at least some cellular communications, such as CMAS messages). Such operating modes may consume less power than fuller functionality baseband operating modes, such as voice capable or voice and data capable operating modes in which a wireless device can both transmit or receive cellular communications. For example, the manner in which the baseband communication circuitry operates may be modified to reduce power consumption. This may potentially include optimizing operation for the reception only of emergency (e.g., CMAS) messages (e.g., including preventing other operations and/or discarding other pages/requests/signals), reducing signaling burden for periodic re-registrations (e.g., attach, detach, tracking area updates (TAUs, routing area updates (RAUs), location area updates (LAUs), etc.), an increased idle discontinuous reception (IDRX) cycle length, reduced frequency and/or scope of neighbor cell measurements, modified signal strength and/or signal quality threshold(s) for various purposes, and/or any other desired modifications in camp-only/CMAS mode. Note that, at least according to some embodiments, it may be possible for an accessory device with GPS capable baseband circuitry to use the GPS functionality in both airplane mode and in CMAS mode.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An accessory wireless device, comprising:
   wireless communication circuitry, comprising at least cellular communication circuitry and short-range wireless communication circuitry; and
   one or more processors coupled to the wireless communication circuitry, wherein the one or more processing elements are configured to cause the accessory wireless device to:
      determine whether the accessory wireless device is operating in a relay mode using a short-range wireless communication link with a companion user equipment device (UE), wherein operating in the relay mode includes using cellular functionality of the companion UE to communicate with a cellular base station;
      determine one or more metrics associated with user activity or application activity at the accessory wireless device; and
      determine whether to limit functionality of the cellular communication circuitry based at least in part on (a) whether the accessory wireless device is operating in the relay mode using the short-range wireless communication link and (b) the one or more metrics associated with user activity or application activity at the accessory wireless device.

2. The accessory wireless device of claim 1,
   wherein, when the accessory wireless device is operating in the relay mode using the short-range wireless communication link with the companion UE, the one or more processors are further configured to cause the accessory wireless device to:
   determine a type of the short-range wireless communication link; and
   determine whether to limit functionality of the cellular communication circuitry further based at least in part on the type of the short-range wireless communication link.

3. The accessory wireless device of claim 1,
   wherein if the accessory wireless device does not have a short-range wireless communication link with a companion UE, the one or more processors are further configured to cause the accessory wireless device to:
   determine a length of time for which the accessory wireless device has not had a short-range wireless communication link with a companion UE; and
   determine whether to limit functionality of the cellular communication circuitry further based at least in part on the length of time for which the accessory wireless device has not had a short-range wireless communication link with a companion UE.

4. The accessory wireless device of claim 1,
   wherein the one or more metrics associated with user activity or application activity at the accessory wireless device comprise at least whether any application executing at the accessory wireless device is currently actively performing wireless communication.

5. The accessory wireless device of claim 1,
   wherein the one or more metrics associated with user activity or application activity at the accessory wireless device comprise one or more of:
   a physical position of the accessory wireless device relative to a user of the accessory wireless device; or
   a screen state of the accessory wireless device.

6. The accessory wireless device of claim 1, wherein the one or more processors are further configured to cause the accessory wireless device to:
   determine whether the accessory wireless device has a subscriber identity module that provides a cellular service plan,
   determine whether to limit functionality of the cellular communication circuitry further based at least in part on whether the accessory wireless device has a subscriber identity module that provides a cellular service plan.

7. A method, comprising:
   at an accessory device:
   determining whether the accessory device has a short-range wireless communication link with a companion user equipment device (UE), wherein the short-range wireless communication link is useable for operating in a relay mode including using cellular functionality of the companion UE to communicate with a cellular base station;
   determining, in response to a determination that the accessory device does not have the short-range wireless communication link with the companion UE, a length of time for which the accessory device has not had the short-range communication link with the companion UE;
   comparing the length of time to a threshold; and
   determining a cellular baseband operating mode based at least in part on the determination that the accessory device does not have the short-range wireless communication link with the companion UE and further based at least in part on said comparing the length of time for which the accessory device has not had the short-range communication link with the companion UE to the threshold.

8. The method of claim 7,
   wherein the cellular baseband operating mode is further determined based at least in part on one or more metrics associated with user settings, user activity or application activity at the accessory device.

9. The method of claim 7, wherein determining the cellular baseband operating mode further comprises:
   determining to limit baseband functionality of the accessory device if a length of time for which the accessory device has not had a first type of short-range communication link with the companion UE is less than a first threshold or if a length of time for which the accessory device has not had a second type of short-range communication link with the companion UE is less than a second threshold.

10. The method of claim 7, wherein the cellular baseband operating mode is further determined based on a SIM state update.

11. The method of claim 7, wherein the cellular baseband operating mode is further determined based at least in part on a determination that the accessory device is in a locked state, wherein the cellular baseband operating mode does not include telephony.

12. The method of claim 7, wherein the cellular baseband operating mode is further determined based at least in part on a position of the accessory device relative to a user.

13. An apparatus, comprising:
one or more processors, wherein the one or more processors are configured to cause an accessory device to:
determine that the accessory device does not have a short-range wireless communication link with a companion user equipment device (UE) useable for operating in a relay mode, wherein operating in said relay mode includes using cellular functionality of the companion UE to communicate with a cellular base station;
in response to the determination that the accessory device does not have the short-range wireless communication link with the companion UE useable for operating in the relay mode, determine a length of time for which the accessory device has not had the short-range communication link with the companion UE;
compare the length of time to a threshold; and
determine a cellular baseband operating mode based at least in part on the determination that the accessory device does not have the short-range wireless communication link with the companion UE and further based at least in part on said comparing the length of time for which the accessory device has not had the short-range communication link with the companion UE to the threshold.

14. The apparatus of claim 13,
wherein the cellular baseband operating mode is further determined based at least in part on a minimum functionality level associated with user settings, user activity or application activity at the accessory device.

15. The apparatus of claim 14,
wherein, in response to a determination that the accessory device is in a locked state, the minimum functionality level associated with user settings, user activity or application activity at the accessory device does not include telephony.

16. The apparatus of claim 13,
wherein the cellular baseband operating mode is further determined based on a SIM state update.

17. The apparatus of claim 13,
wherein the cellular baseband operating mode is further determined based at least in part on a determination that the accessory device is in an unlocked state, wherein the cellular baseband operating mode includes telephony.

18. The apparatus of claim 13,
wherein the cellular baseband operating mode is further determined based at least in part on a position of the accessory device relative to a user.

19. The apparatus of claim 18,
wherein the accessory device is worn by the user.

20. The apparatus of claim 13,
wherein the cellular baseband operating mode is further determined based at least in part on a type of short-range communication link, wherein the threshold is related to the type of short-range communication link.

* * * * *